United States Patent
Kanamori et al.

(10) Patent No.: US 7,012,412 B2
(45) Date of Patent: Mar. 14, 2006

(54) SWITCHING POWER SOURCE CIRCUIT CAPABLE OF TURNING OFF AN "OFF" DRIVE CIRCUIT BEFORE A DRIVE CONTROL SIGNAL BECOMES ACTIVE AND AN ELECTRONIC DEVICE USING THE SAME

(75) Inventors: Atsushi Kanamori, Nara (JP); Kazufumi Oki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 55 days.

(21) Appl. No.: 10/761,463

(22) Filed: Jan. 22, 2004

(65) Prior Publication Data
US 2004/0150379 A1  Aug. 5, 2004

(30) Foreign Application Priority Data
Jan. 24, 2003  (JP)  ............................. 2003-016757

(51) Int. Cl.
*G05F 1/40* (2006.01)
(52) U.S. Cl. .................................................... 323/283

(58) Field of Classification Search ................ 323/283, 323/282; 327/173, 176, 177
See application file for complete search history.

(56) References Cited

U.S. PATENT DOCUMENTS 4,309,650 A * 1/1982 Boros et al. ................. 323/283
5,617,016 A * 4/1997 Borghi et al. ................ 323/284

FOREIGN PATENT DOCUMENTS

JP   7-288974 A   10/1995
JP   8-214541 A   8/1996

* cited by examiner

*Primary Examiner*—Shawn Riley
(74) *Attorney, Agent, or Firm*—Birch,Stewart,Kolasch & Birch,LLP

(57) ABSTRACT

A pulse width control circuit provided in a drive circuit instructs an OFF drive circuit to operate for a period shorter than an inactive period of a drive control signal. Thus, when the drive control signal is inactive, the OFF drive circuit begins operating, and draws a current from a base of a switching element, thereby turning OFF the switching element. Further, the OFF drive circuit stops operating before the drive control signal becomes active.

14 Claims, 14 Drawing Sheets

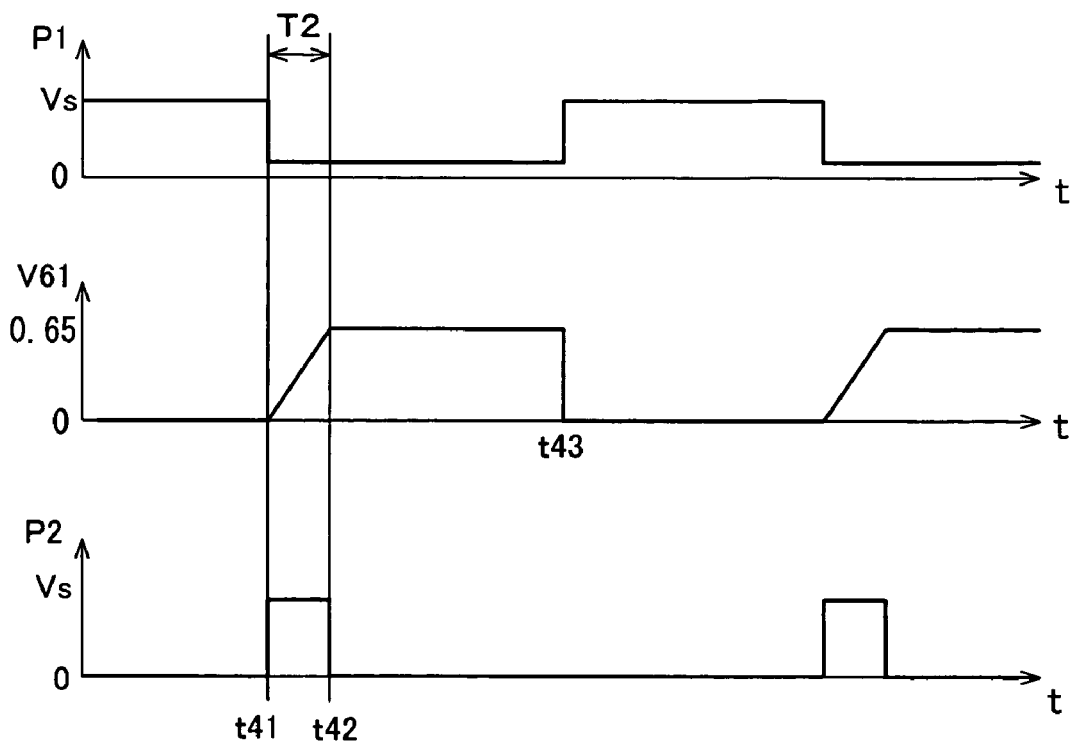
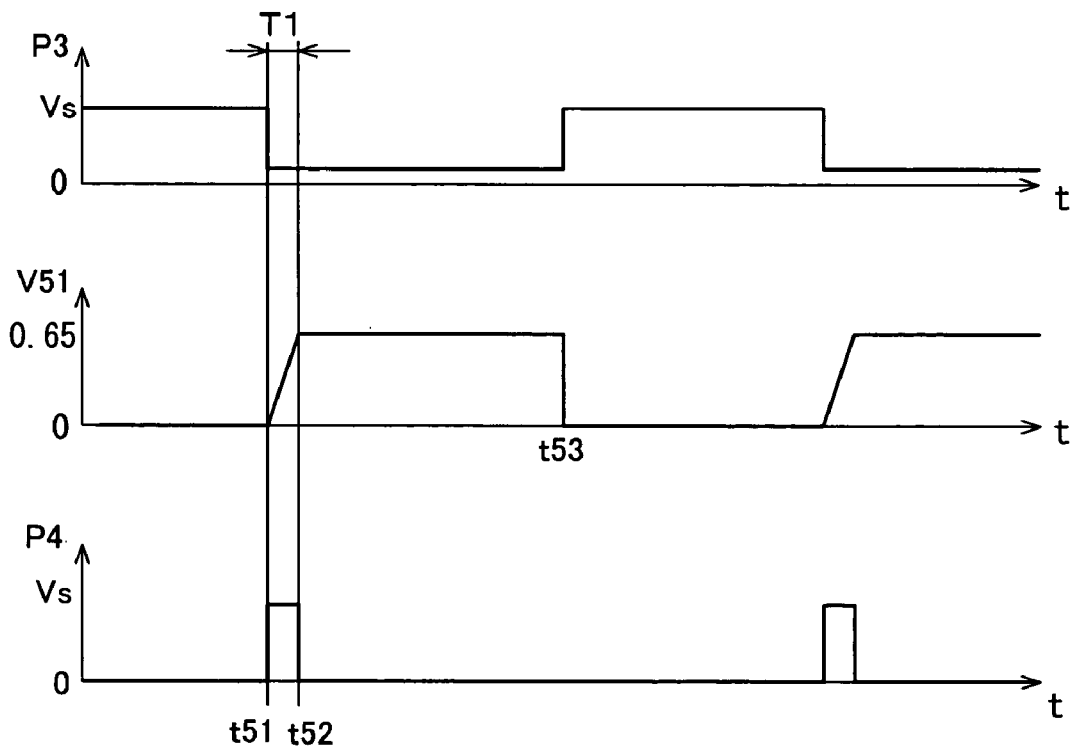

SWITCHING POWER SOURCE CIRCUIT CAPABLE OF TURNING OFF AN "OFF" DRIVE CIRCUIT BEFORE A DRIVE CONTROL SIGNAL BECOMES ACTIVE AND AN ELECTRONIC DEVICE USING THE SAME

This Nonprovisional application claims priority under 35 U.S.C. § 119(a) on Patent Application No. 2003/16757 filed in Japan on Jan. 24, 2003, the entire contents of which are hereby incorporated by reference.

FIELD OF THE INVENTION

The present invention relates to a switching power source circuit and an electronic device using the same.

BACKGROUND OF THE INVENTION

A switching power source circuit, which intermits inputted power, and smoothes the power, and supplies thus smoothed power to a load, can be more easily realized by a highly efficient and small circuit than a linear regulator. Thus, conventionally, the switching power source circuit has been widely used, for example, as a power source circuit of an in-vehicle device (such as a car audio), a liquid crystal television, or a peripheral device and the like of a personal computer.

For example, each of Japanese Unexamined Patent Publication No. 288974/1995 (Tokukaihei 7-288974)(Publication date: Oct. 31, 1995) and Japanese Unexamined Patent Publication No. 214541/1996 (Tokukaihei 8-214541)(Publication date: Aug. 20, 1996) shows such a conventional switching power source circuit (referred to as a switching power circuit 101) that: as shown in FIG. 13, after being intermitted by a switching element 111, an input voltage Vin is smoothed by a smoothing circuit 112, and thus smoothed voltage is outputted to a load 103 as an output voltage Vout.

While, in a control circuit 113 of the switching power source circuit 101, a voltage dividing circuit 121 divides the output voltage Vout so as to generate a feedback voltage Vadj, and a differential amplifier 123 amplifies an error between the feedback voltage Vadj and a reference voltage Vref. Further, a PWM comparator 125 compares an error voltage Verr outputted by the differential amplifier 123 with a triangular wave Vosc, so as to generate a PWM signal Vpwm having a duty ratio according to the error as shown in FIG. 14. Further, a gate circuit 127 outputs the PWM signal Vpwm without modification as a drive control signal Vdrv when the duty ratio of the PWM signal Vpwm does not exceed a predetermined upper limit.

Further, while the drive control signal Vdrv is active, an ON drive circuit 131 operates so as to supply a current to a base of the switching element 111. Thus, the switching element 111 becomes ON. (during a period from t101 to t102 shown in FIG. 14). While the drive control signal Vdrv is inactive, an OFF drive circuit 132 draws a current from the base of the switching element 111. Thus, the switching element 111 becomes OFF (during a period from t102 to t103).

More specifically, for example, as shown in FIG. 15, when the drive control signal Vdrv is active, a switch SW121 of the ON drive circuit 131 becomes ON, so that a constant current I121 from a constant current source I121 is inputted to a current mirror circuit constituted of transistors Q121 and Q122. Under such condition, the current mirror circuit supplies a current, interrelated with the constant current, to the base of the switching element 111. As a result, the switching element 111 becomes ON.

Further, when the drive control signal Vdrv is inactive, the switch SW121 becomes OFF, so that the constant current source 121 stops supplying a current to the current mirror circuit. While the drive control signal Vdrv is inactive, the switch SW131 in the OFF drive circuit 132 becomes ON, so that a constant current I131 from the constant current source I131 is inputted to a current mirror circuit constituted of transistors Q131 and Q132. Under such condition, the current mirror circuit supplies a current, interrelated with the, constant current, to a base of a transistor Q130, and the transistor Q130 draws a current from the base of the switching element 111. Thus, the switching element 111 becomes OFF.

SUMMARY OF THE INVENTION

Here, in the switching power source circuit, improvement of power source conversion efficiency is one of the most important objects. Recently, with (i) popularization of portable electronic devices which can be driven by a buttery or (ii) enhancement of environmental concerns, the power source conversion efficiency is required to be further improved. However, the switching power source circuit arranged in the foregoing manner cannot sufficiently improve the power source conversion efficiency, so that there is room for improvement.

The present invention was devised as a result of study on an operational period of an OFF drive circuit required in normally operating a switching power source circuit, and its object is to provide (i) a switching power source circuit whose power source conversion efficiency is high and (ii) an electronic device using the switching power source circuit.

These and other aspects may be realized by providing the switching power source circuit with an ON drive circuit for generating an ON drive current which causes a switching element to be turned ON. In addition, an OFF drive circuit is provided for generating an OFF drive current which causes the switching element to be turned OFF. A control circuit for controlling both the ON drive circuit and OFF drive circuit, so as to adjust a duty ratio of the switching element so that an output voltage has a predetermined value, is also provided. Furthermore, an OFF drive control circuit for causing the OFF drive circuit to begin operating at the same time as an OFF period of the switching element begins, and for causing the OFF drive circuit to stop operating before the OFF period of the switching element ends, is provided.

By using the foregoing arrangement, the ON drive circuit preferably generates the ON drive current in accordance with instructions given by the control circuit, thereby turning ON the switching element. Furthermore, the OFF drive circuit generates the OFF drive current in accordance with instructions given by the control circuit, thereby turning OFF the switching element. Here, the control circuit controls the ON and OFF drive circuits by adjusting the duty ratio so that the output voltage has a predetermined value while intermittingly operating the switching element. Thus, the switching power source circuit can steadily supply a predetermined voltage to a load regardless of variation of the input voltage and variation of the load.

Further, the OFF drive control circuit causes the OFF drive circuit to begin operating at the same time as the OFF period of the switching element begins, for example, by shortening the pulse width of the pulse signal (OFF drive control signal) by which the control circuit instructs the OFF drive circuit to operate. In addition, the OFF drive control circuit causes the OFF drive circuit to stop operating before the OFF period of the switching element ends.

Again, by the foregoing arrangement, the OFF drive circuit can operate at the same time as when the OFF period of the switching element begins, so that it is possible to turn OFF the switching element without any trouble. Further, the OFF drive circuit stops operating before the OFF period of the switching element ends, so that it is possible to reduce an average value of the OFF drive current. It is also possible with the present arrangement to reduce power consumption as compared with a case where the OFF drive circuit continues to operate during the OFF period. Note that, when the OFF drive circuit stops operating, the OFF drive current is not generated. Furthermore, the switching element is shut down while the OFF drive circuit is being operated, so that it is possible to continue to shout down the switching element without any trouble during rest of the OFF period, that is, until the ON drive circuit begins operating again.

As a result, it is possible to realize a switching power source circuit whose power source conversion efficiency is high compared with an arrangement in which the OFF drive circuit continues to operate during the OFF period of the switching element.

Further, in addition to the foregoing arrangement, another aspect of the present invention includes an arrangement whereby the OFF drive circuit includes a constant current source, and a current mirror circuit for generating, as the OFF drive current, a current which is interrelated with a current outputted by the constant current source, so as to supply thus generated current to a control terminal of the switching element, or so as to draw thus generated current from the control terminal. A stopping circuit is also provided for causing the constant current source to stop outputting the current while the OFF drive controlling circuit indicates stoppage of operation.

In the above noted arrangement, the current mirror circuit is preferably used to supply the OFF drive current to the control terminal of the switching element, or to draw the OFF drive current from the control terminal. The OFF drive circuit can include not only a current path allowing the OFF drive current to flow but also a current path allowing a current outputted by the constant current source to flow. Thus, when the OFF drive circuit continues to operate during the OFF period of the switching element, the OFF drive circuit consumes not only the OFF drive current but also the current outputted by the constant current source. However, according to the foregoing arrangement, the stopping circuit is provided, and causes the constant current source to stop supplying the current while the OFF drive control circuit instructs the OFF drive circuit to stop operating. As a result, it is possible to realize a switching power source circuit whose power source conversion efficiency is high due in part to the current mirror circuit that is being provided.

Further, in addition to the foregoing arrangement, in still another aspect of the present invention, it may be so arranged that the OFF drive circuit includes a constant current source, a current mirror circuit for outputting a current which is interrelated with a current outputted by the constant current source, a current amplifying circuit for amplifying, as the OFF drive current, the current outputted by the current mirror circuit, so as to supply thus amplified current to a control terminal of the switching element, or so as to draw thus amplified current from the control terminal, and a stopping circuit for causing the constant current source to stop outputting the current while the OFF drive controlling means instructs the OFF drive circuit to stop operating.

As in the aforementioned arrangement having the stopping circuit, this arrangement is such that the stopping circuit is provided, and the stopping circuit causes the constant current source to stop supplying the current while the OFF drive control circuit instructs the OFF drive circuit to stop operating. Thus, it is possible to realize a switching power source circuit whose power source conversion efficiency is high due in part to the current mirror circuit being provided. Further, in the foregoing arrangement, the current amplifying circuit is provided, so that it is possible to increase an amount of the current which is supplied to the control terminal of the switching element or drawn from the control terminal. As a result, it is possible to reduce a storage time and a drop time of the switching element compared with a case where the current amplifying circuit is not provided, thereby further improving the power source conversion efficiency.

Further, in addition to the foregoing arrangement, in yet another aspect of the present invention, it may be so arranged that the OFF drive controlling circuit outputs a duty limit signal for determining an upper limit of the duty ratio of the switching element. In such a case, the duty limit signal is set so that the OFF period of the switching element is longer than an operational period of the OFF drive circuit when the duty ratio has an upper limit value.

In the foregoing arrangement, by setting the pulse width, for example, the duty limit signal is set so that the OFF period of the switching element, when the duty ratio has the upper limit value, is longer than the operational period of the OFF drive circuit. Thus, the operational period of the OFF drive circuit is ordinarily shorter than the OFF period of the switching element regardless of conditions of the input voltage and the load.

Further, the OFF drive circuit can control the operational period of the OFF drive circuit, and can generate the duty limit signal. Thus, unlike an arrangement in which a circuit provided separately from the OFF drive circuit is responsible for generating the duty limit signal, even when the operational period of the OFF drive circuit has a value which deviates from a designed value due to manufacturing unevenness and variation of ambient temperature, the OFF period of the switching element, in the case where the duty ratio has the upper limit value, also has a value which deviates from a designed value in a similar manner.

As a result, the operational period of the OFF drive circuit can be made shorter than the OFF period of the switching element, so that it is possible to set the operational period of the OFF drive circuit so as not to overlap with the ON period of the switching element. Thus, even when the duty ratio has the upper limit value, it is possible to realize the switching power source circuit which can surely turn OFF the switching element and has high power source conversion efficiency.

Further, in addition to the foregoing arrangement, another aspect of the present invention has an arranged whereby the OFF drive controlling circuit includes a reference constant current source for generating a reference constant current, a constant current generating current mirror circuit for generating a first constant current and a second constant current each of which is interrelated with the reference constant current outputted by the reference constant current source, a first pulse generating circuit for determining a pulse width of the OFF drive control signal indicative of the operational period of the OFF drive circuit in accordance with the first constant current, and a second pulse generating circuit for determining a pulse width of the duty limit signal in accordance with the second constant current.

In the foregoing arrangement, the first pulse generating circuit for determining the pulse width of the OFF drive control signal and the second pulse generating circuit for determining the pulse width of the duty limit signal respectively determine the pulse widths in accordance with constant currents (first or second constant current) each of which is interrelated with the constant current generated by the reference constant current source. Thus, for example, even when the operational period of the OFF drive circuit has a value, which deviates from a designed value, due to manufacturing unevenness and variation of ambient temperature, the OFF period of the switching element, in the case where the duty ratio has the upper limit value, also has a value which deviates from a designed value in a similar manner. As a result, even when the duty ratio has the upper limit value, it is possible to realize the switching power source circuit which can surely turn OFF the switching element and has high power source conversion efficiency.

Further, an electronic device according to the present invention includes any one of the switching power source circuits arranged in the above noted foregoing manners. Thus, it is possible to realize an electronic device which can consume less power.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a waveform schematic showing how a duty limit signal generating circuit provided in the pulse width control circuit operates.

FIG. 9 is a waveform schematic showing how an OFF drive control signal generating circuit provided in the pulse width control circuit operates.

DESCRIPTION OF THE EMBODIMENTS

[Embodiment 1]

Figure 1:
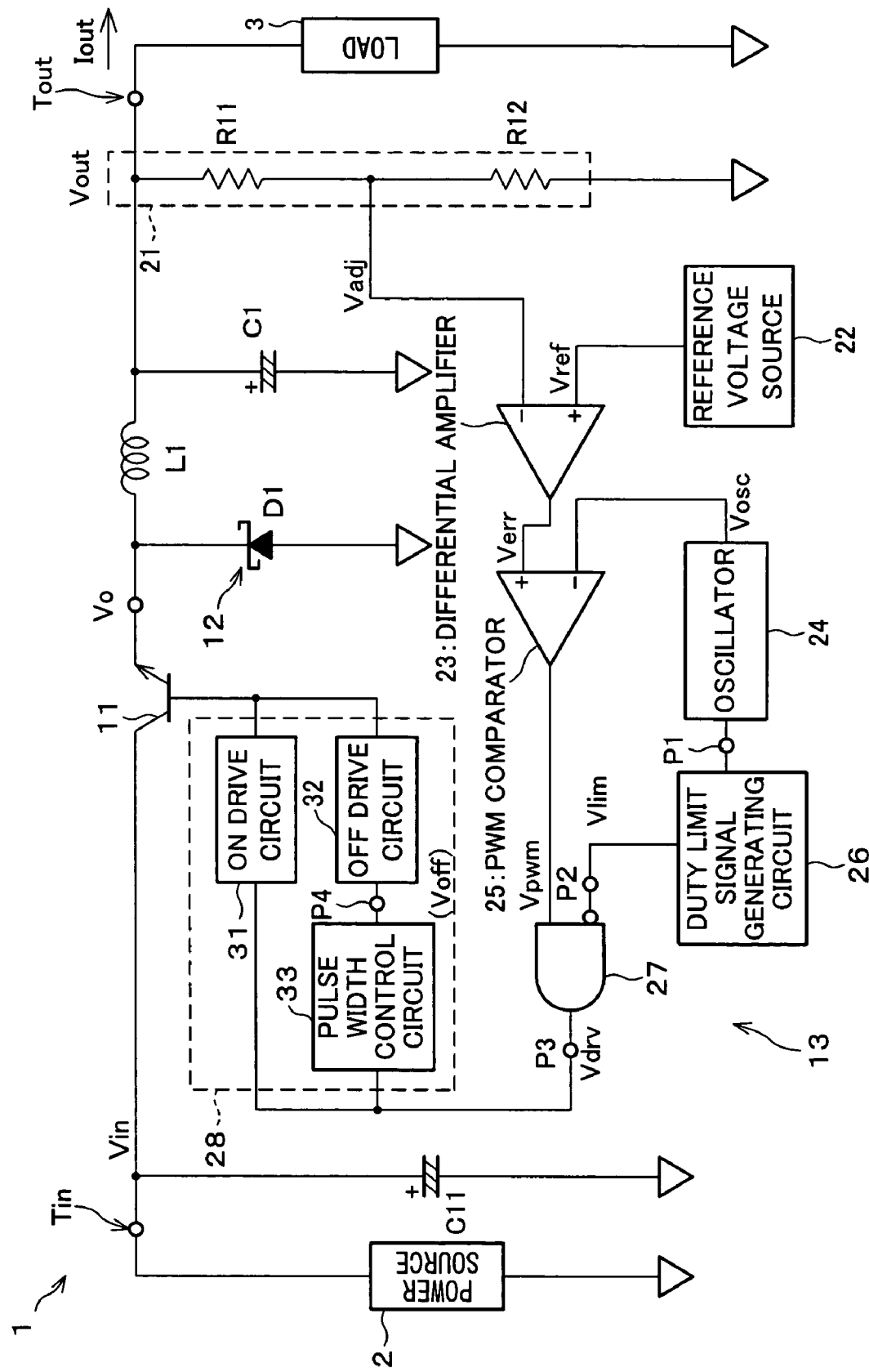
FIG. 1 shows an embodiment of the present invention, and is a block diagram showing important components of a switching power source circuit.
Figure 2:
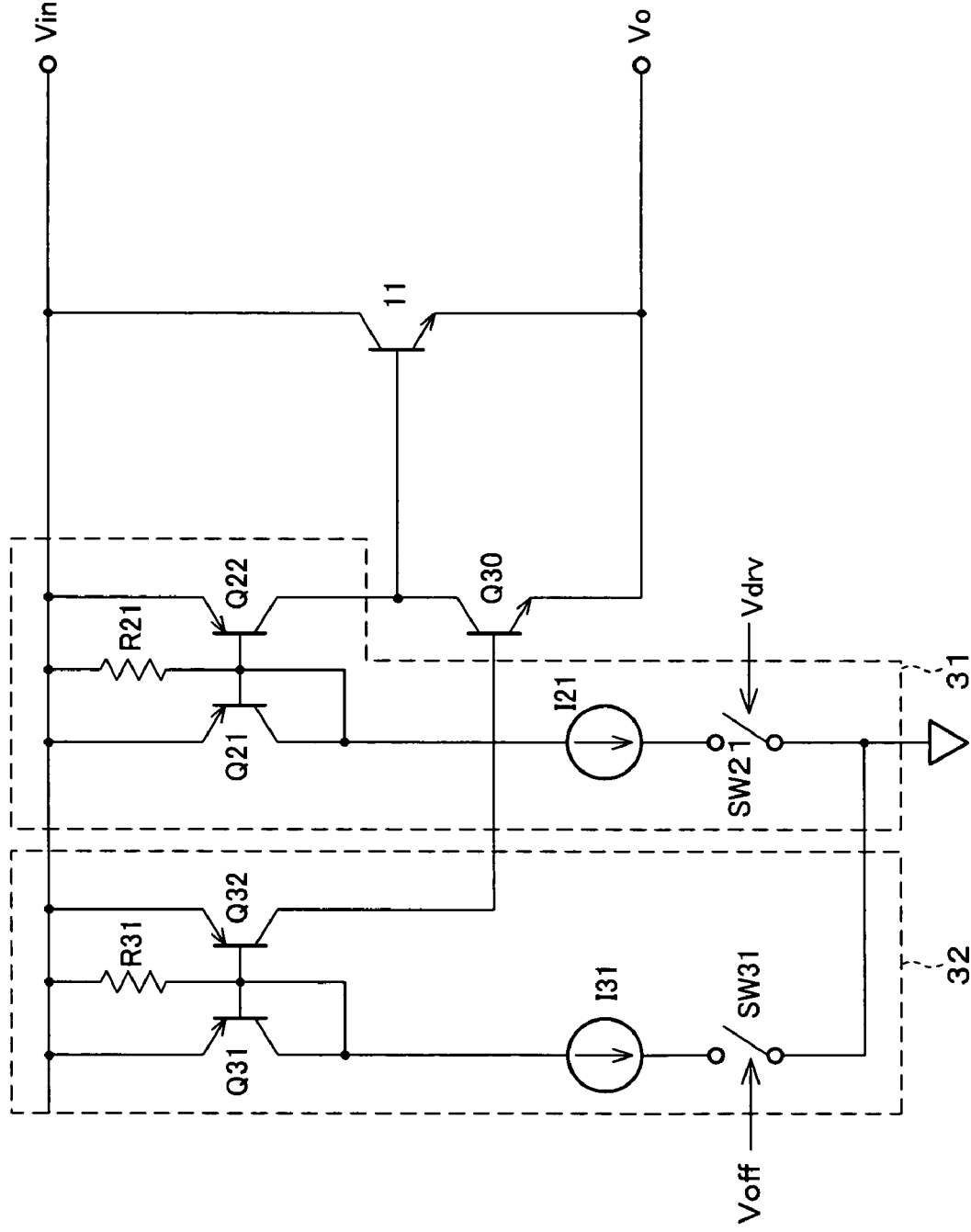
FIG. 2 is a circuit diagram showing important components of an ON drive circuit and an OFF drive circuit that are provided in the switching power source circuit.
Figure 3:
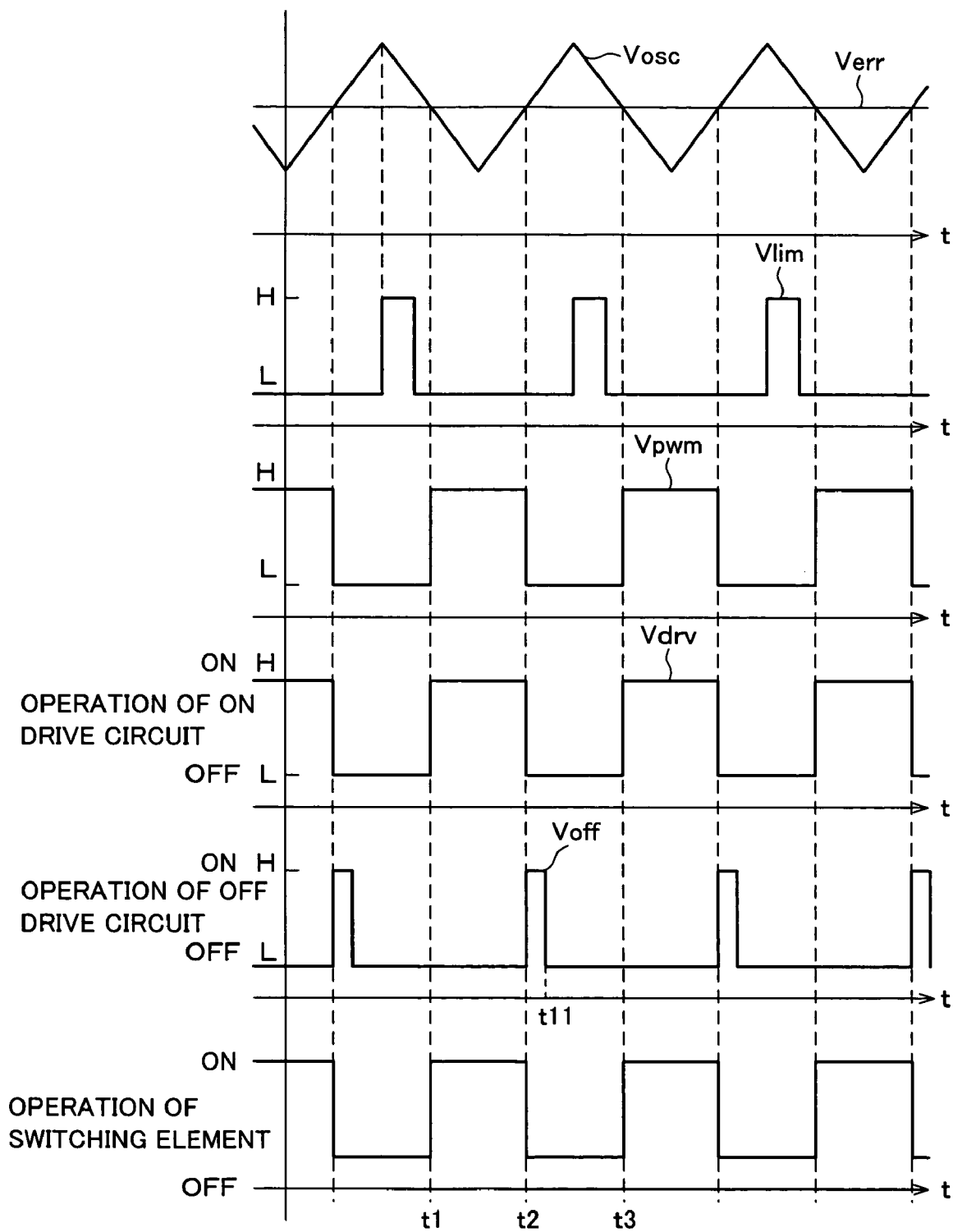
FIG. 3 is a waveform schematic showing how the switching power source circuit operates.

The following description will explain one embodiment of the present invention with reference to FIG. 1 to FIG. 3. That is, as shown in FIG. 1, a switching power source circuit 1 according to the present embodiment stabilizes a voltage Vin applied from a power source 2 to an input terminal Tin, and supplies thus stabilized voltage to a load 3 via an output terminal Tout. This switching power source circuit 1 is preferably used as a power source circuit for supplying power to an electronic device or as a general power source circuit for example.

The switching power source circuit 1 includes: a switching element 11 disposed between both the terminals Tin and Tout; a smoothing circuit 12 for smoothing an output voltage Vo of the switching element 11 so as to supply thus smoothed voltage to the output terminal Tout; and a control circuit 13 for controlling a ratio of an ON period and an OFF period of the switching element 11 in accordance with a voltage Vout of the output terminal Tout so that the output voltage Vout has a constant value Vc.

The switching element 11 according to the present embodiment is constituted of an NPN-type bipolar transistor, and the control circuit 13 supplies a current to a base of the transistor or draws the current from the base of the transistor, so as to control ON/OFF of the transistor.

Further, the smoothing circuit 12 according to the present embodiment, for example, includes: a coil L1 disposed between the switching element 11 and the output terminal Tout; a diode D1 whose cathode is connected to a junction of the coil L1 and the switching element 11 and anode is grounded; and a capacitor C1 whose one end is connected to a junction of the coil L1 and the output terminal Tout and another end is grounded. Further, in the present embodiment, the input terminal Tin is grounded via the capacitor C11, and smoothes the input voltage Vin.

While, the control circuit 13 includes: a voltage dividing circuit 21, constituted of resistors R11 and R12, which divides the output voltage Vout so as to generate a feedback voltage Vadj; a reference voltage source 22 for generating a predetermined reference voltage Vref; a differential amplifier 23 for amplifying a difference between both the voltages Vadj and Vref; the oscillator 24 for generating a triangular wave Vosc; a PWM comparator 25 for comparing an error voltage Verr outputted by the differential amplifier 23 with the triangular wave Vosc outputted from the oscillator 24, so as to generate a PWM (Pulse Width Modulation) signal Vpwm having a duty ratio according to the error voltage Verr; a duty limit signal generating circuit 26 for generating a duty limit signal Vlim which is active in synchronism with the output signal Vosc of the oscillator 24 and during a predetermined period; a gate circuit 27 for making its output active only when the PWM signal Vpwm is active and the duty limit signal Vlim is inactive; and a drive circuit 28 for turning ON/OFF the switching element 11 at a duty ratio of a drive control signal Vdrv outputted by the gate circuit 27. Note that, the members 23, 25, and 27 correspond to control means recited in claims.

In the foregoing arrangement, for example, when the output voltage Vout tends to have a value lower than a predetermined value Vc due to drop in the input voltage Vin and increase in current consumption of the load 3, also the feedback voltage Vadj tends to have a value lower than the reference voltage Vref with variation of the output voltage Vout. While, the differential amplifier 23 amplifies an error between both the voltages Vadj and Vref, and the duty ratio of the output signal Vpwm of the PWM comparator 25 is increased in response to subtle variation of the output voltage Vout. Accordingly, the drive circuit 28 increases a ratio of ON periods of the switching element 11 so as to suppress the drop in the output voltage Vout.

Inversely, when the output voltage Vout rises, the duty ratio of the output signal Vpwm of the comparator PWM 25 drops, so that the drive circuit 28 decreases the ratio of the ON periods of the switching element 11 so as to suppress the increase in the output voltage Vout.

Here, the differential amplifier 23 detects variation of the output voltage Vout in accordance with variation of the feedback voltage Vadj with certain accuracy. Further, the ratio of the ON periods of the switching element 11 is controlled with a certain response speed so that the drive circuit 28 stops the variation of the output voltage Vout after the differential amplifier 23 detects the variation of the output voltage Vout. The accuracy and the response speed are set to be sufficiently high so that the variation of the output voltage Vout that is caused by the variation of the input voltage Vin and the variation of the current consumption of the load 3 is within a predetermined permissible range. Thus, the switching power source circuit 1 can continue to apply a constant voltage Vc to the load 3 regardless of the variation of the input voltage Vin and the variation of the current consumption of the load 3.

Further, the drive circuit 28 according to the present embodiment includes not only (i) an ON drive circuit 31 for supplying a current to the base of the switching element 11, while the drive control signal Vdrv is active, so as to turn ON the switching element 11, and (ii) an OFF drive circuit 32 for drawing a current from the base of the switching element 11, while an OFF drive control signal Voff instructs the OFF drive circuit 32 to operate, so as to turn OFF the switching element 11, but also (iii) a pulse width control circuit (OFF drive control means) 33 for setting the OFF drive control signal Voff so as to instruct the OFF drive circuit 32 to operate only for a predetermined period that has passed since the drive control signal Vdrv became inactive, i.e., only for a period determined so as to be shorter than a period in which the drive control signal Vdrv is inactive.

The ON drive circuit 31, for example, includes: a constant current source I21; a current mirror circuit, constituted of PNP-type bipolar transistors Q21 and Q22, which supplies a current (for example, a current which is substantially in proportion to the current I21) interrelated with a current I21 supplied from the constant current source I21 to the base of the switching element 11, as an ON current; and a switch (stopping means) SW21 for causing the constant current source I21 to begin/stop supplying the current, as shown in FIG. 2.

In more detail, bases of the transistors Q21 and Q22 are connected to each other, and are further connected to a collector of the transistor Q21. Further, the collector of the transistor Q21 is connected to the constant current source I21, and a collector of the transistor Q22 is connected to the base of the switching element 11. Further, the constant current source I21 is grounded via the switch SW21. Further, the switch SW21 becomes ON when the drive control signal Vdrv is active, and the switch SW21 becomes OFF when the drive control signal Vdrv is inactive. Note that, the input voltage Vin is applied to emitters of both the transistors Q21 and Q22 via the input terminal Tin, and the input voltage Vin is applied to the bases of both the transistors Q21 and Q22 via a resistor R21.

Likewise, the OFF drive circuit 32 includes: an NPN-type bipolar transistor (current increasing means) Q30 disposed between the base and the emitter of the switching element 11; a constant current source I31; a current mirror circuit, constituted of PNP-type bipolar transistors Q31 and Q32, which supplies a current interrelated with a current I31 supplied from the constant current source I31 to the base of the transistor Q30; and a switch (stopping means) SW31 for causing the constant current source I31 to begin/stop supplying the current.

In more detail, a collector of the transistor Q30 is connected to the base of the switching element 11, and an emitter of the transistor Q30 is connected to the emitter of the switching element 11. Note that, connection of other members Q31, Q32, I31, SW31, and R31 are performed substantially in the same manner as in the connection of the members Q21, Q22, I21, SW21, and R21. However, a collector of the transistor Q32 is connected to a base of the transistor Q30 unlike the transistor Q22. Further, the switch SW31 operates in accordance with the OFF drive control signal Voff instead of the drive control signal Vdrv, so that the switch SW31 becomes ON when the OFF drive control signal Voff instructs the OFF drive circuit 32 to stop operating and the switch SW31 becomes OFF when the OFF drive control signal Voff instructs the OFF drive circuit 32 to operate.

Unlike the ON drive circuit 31, the OFF drive circuit 32 causes the current mirror circuit not to directly drive the switching element 11 but to drive the transistor Q30 connected to the base of the switching element 11 in order to shorten a storage time and a fall time of the switching element 11. Thus, from the base of the switching element 11, as an OFF current, the OFF drive circuit 32 can draw more currents than (preferably, several times as many as) a current supplied by the ON drive circuit 31.

For example, supposing that the constant current I21=2.65[mA], and the resistor R21=1[kΩ], and a base-emitter voltage of each of the transistors Q21 and Q22 is 0.65[V], and a collector ratio of the transistors Q21 and Q22 is 1:40, a current that the ON drive circuit 31 supplies to the base of the switching element 11 is (2.65[mA]−0.65/1[kΩ])×40=80[mA].

Further, supposing that the constant current I31=3.05 [mA], and the resistor R31=1[kΩ], and a base-emitter voltage of each of the transistors Q31 and Q32 is 0.65[V], and an emitter area ratio of the transistors Q31 and Q32 is 1:2, and the transistor's hfe=50, a current that the OFF drive circuit 32 draws from the base of the switching element 11 is (3.05[mA]−0.65/1[kΩ])×2×50=240[mA](maximum value).

In the foregoing arrangement, as shown in FIG. 3, the PWM comparator 25 shown in FIG. 1 compares the error voltage Verr outputted from the differential amplifier 23 with the triangular wave Vosc outputted from the oscillator 24 so as to generate a PWM signal Vpwm having a duty ratio according to the error voltage Verr. Note that, as an example, FIG. 3 shows a case where the error voltage Verr becomes higher as the feedback voltage Vadj becomes lower than the reference voltage Vref, and the PWM comparator 25 makes the PWM signal Vpwm active when the error voltage Verr is higher than the triangular wave Vosc. Further, in the example of FIG. 3, a level of the PWM signal Vpwm becomes high in an active state.

Here, the example of FIG. 3 shows a case where the error voltage Verr is relatively low and an inactive period of the PWM signal Vpwm is longer than an active period of the duty limit signal Vlim. Thus, the gate circuit 27 outputs the drive control signal Vdrv having the same duty ratio as the PWM signal Vpwm.

During a period in which the drive control signal Vdrv is active (period from t1 to t2), the switch SW21 shown in FIG. 2 becomes ON, so that the ON drive circuit 31 begins operating so as to supply a current to the base of the switching element 11. As a result, the switching element 11 becomes ON.

Specifically, when the switch SW21 becomes ON, there is formed a current path which extends from the input terminal Tin via the transistor Q21, the constant current source I21, and the switch SW21 to a ground level, so that the constant current I21 flows in the transistor Q21. Thus, the current mirror circuit constituted of both the transistors Q21 and Q22 begins operating, so that the transistor Q22 supplies a current, which is interrelated with the constant current I21 flowing in the transistor Q21, to the base of the switching element 11. Thus, the switching element 11 becomes ON.

Note that, during a period in which the drive control signal Vdrv is active, the OFF drive control signal Voff instructs the OFF drive circuit 32 to stop operating, so that the switch SW31 shown in FIG. 2 becomes OFF. Thus, the OFF drive circuit 32 stops operating, and does not draw a current from the base of the switching element 11. Thus, the ON drive circuit 31 can turn ON the switching element 11 without any trouble.

On the other hand, when the drive control signal Vdrv becomes inactive at t2, the OFF drive control signal Voff instructs the OFF drive circuit 32 to operate (in the example of FIG. 3, H level). Thus, the OFF drive circuit 32 begins operating so as to draw a current from the base of the switching element 11.

Specifically, when the OFF drive control signal Voff instructs the OFF drive circuit 32 to operate, the switch SW31 becomes ON. Thus, there is formed a current path which extends from the input terminal Tin via the transistor Q31, the constant current source I31, and the switch SW31 to a ground level, so that the constant current I31 flows in the transistor Q31. Thus, the current mirror circuit constituted of both the transistors Q31 and Q32 begins operating, and the transistor Q32 supplies a current, which is interrelated with the constant current I31 flowing in the transistor Q31, to the base of the transistor Q30. Thus, the transistor Q30 becomes ON so as to draw a current from the base of the switching element 11. As a result, the switching element 11 becomes OFF.

Note that, during a period in which the drive control signal Vdrv is inactive (period from t2 to t3), the switch SW21 of the ON drive circuit 31 becomes OFF, so that the ON drive circuit 31 stops operating so as not to supply a current to the base of the switching element 11. Thus, the OFF drive circuit 32 can turn OFF the switching element 11 without any trouble.

Here, in the switching power source circuit 1 according to the present embodiment, as shown in FIG. 3, the OFF drive control signal Voff instructs the OFF drive circuit 32 to stop operating at a time (t11) before the drive control signal Vdrv becomes active. As a result, the OFF drive circuit 32 stops operating during a period shorter than a period in which the drive control signal Vdrv is inactive, so that the OFF drive circuit 32 does not draw a current from the base of the switching element 11.

Specifically, in the OFF drive circuit 32, the switch SW31 is turned OFF, so that the current path which extends from the input terminal Tin via the transistor Q31, the constant current source I31, and the switch SW31, to the ground level is shut down. Thus, a current does not flow to the transistor Q31, so that the current mirror circuit constituted of the transistors Q31 and Q32 stops operating, and the transistor Q32 stops supplying a current to the base of the transistor Q30. As a result, the transistor Q30 becomes OFF so as not to draw a current from the base of the switching element 11.

Here, although the drive control signal Vdrv is inactive, the OFF drive circuit 32 causes the switch SW31 to be OFF during a period (period from t11 to t3) in which the OFF drive circuit 32 stops operating, so that also the constant current source I31 stops supplying a current to the foregoing current mirror circuit. Thus, the OFF drive circuit 32 continues to operate during the period (period from t2 to t3) in which the drive control signal Vdrv is inactive, so that it is possible to reduce power consumption of the switching power source circuit 1 compared with an arrangement in which the constant current source I31 of the OFF drive circuit 32 continues to supply a constant current to the current mirror circuit.

While, in the switching element 11, a current is sufficiently drawn from the base during a period (t2 to t11) in which the OFF drive circuit 32 operates, so that the switching element 11 is already in an OFF state at a time (t11) when the OFF drive circuit 32 stops operating. Thus, the switching element 11 can continue to be OFF without any trouble for a period (period from t11 to t3) from a time when the ON drive circuit 31 begins operating again to a time when the ON drive circuit 31 begins supplying a current to the base of the switching element 11.

Further, when the drive control signal Vdrv becomes active again (at t3), the ON drive circuit 31 begins operating as in t1, thereby turning ON the switching element 11. Thus, the switching element 11 is turned ON/OFF with a duty ratio indicated by the drive control signal Vdrv.

In this manner, the switching power source circuit 1 according to the present embodiment includes the pulse width control circuit 33 for operating the OFF drive circuit 32 for a period shorter than a period in which the drive control signal Vdrv is inactive. As a result, the OFF drive circuit 32 continues to operate during the period in which the drive control signal Vdrv is inactive, so that it is possible to reduce a base current drawing current of the switching element 11 (a current used to draw a current from the base of the switching element 11). Thus, it is possible to reduce an average value of a current flowing in the control circuit 13 (an average value during whole the period in which the drive control signal Vdrv is inactive), thereby improving efficiency of the switching power source circuit 1.

Here, in the switching power source circuit 1, supposing that an input voltage is Pin and an output voltage is Pout, a power source conversion efficiency η is represented by the following expression (1).

$$\eta = Pout/Pin \quad (1)$$

Further, supposing that loss in the switching power source circuit 1 is P1, the power source conversion efficiency η is represented by the following expression (2).

$$\eta = Pout/(Pout+P1) \quad (2)$$

Further, supposing that power consumption of the switching element 11 is Pt, and power consumption of a diode D1 of the smoothing circuit 12 is Pd, and loss caused by a resistance component of the circuit is Pe, and power consumption of the control circuit 3 is Pq, the power source circuit loss P1 is represented by the following expression (3).

$$P1 = Pq + Pt + Pd + Pe \quad (3)$$

Further, supposing that switching loss is Psw, and a current and a both-end voltage of the switching element 11 while being ON are respectively Vsat and Isw, and a duty ratio is D, the switching element power consumption Pt is represented by the following expression (4).

$$Pt = Psw + Vsat \times Isw \times D \quad (4)$$

Further, supposing that a forward direction voltage of the diode D1 is VF, and a current flowing to the diode D1 is Id, diode power consumption Pd is represented by the following expression (5).

$$Pd = VF \times Id \times (1-D) \quad (5)$$

Here, the duty ratio D is represented by the following expression (6).

$$D = (Vout + VF)/(Vin - Vsat + VF) \quad (6)$$

Further, supposing that a load current is Iout, and a rise time and a fall time of the switching element 11 are respectively tr and tf, and an ON/OFF cycle of the switching element 11 is T, switching loss Psw is represented by the following expression (7).

$$Psw = Vin \times Iout \times (tr + tf)/T \quad (7)$$

Note that, the load current Iout is Iout=Isw×D=Id×(1−D).

Further, the loss Pe caused by circuit resistance components is loss caused by resistance components of circuits positioned between the terminal Tin and the terminal Tout, and wiring resistance and an equivalent series resistance of the coil L are included as the resistance components.

While, supposing that the current consumption of the control circuit 13 is Iq, power consumption Pq of the control circuit 13 is represented by the following expression (8).

$$Pq = Iq \times Vin \quad (8)$$

Further, when the control circuit 13 according to the present embodiment is categorized into groups such as the ON drive circuit 31, the OFF drive circuit 32, and other circuit (for example, the oscillator 24), an average value of the current consumption Iq is represented by the following expression (9).

$$Iq = Iq31 \times D31 + Iq32 \times D32 + Iqoth \quad (9)$$

Note that, in the foregoing expression (9), Iq31 and Iq32 respectively represent the current consumption in the case where the ON drive circuit 31 operates and the current consumption in the case where the OFF drive circuit 32 operates. D31 and D32 respectively represent a ratio of operational periods of the ON drive circuit 31 and a ratio of operational periods of the OFF drive circuit 32. Further, Iqoth represents current consumption of other circuit.

As an example, supposing that Vin=40[V], and Vout=5.0[V], and Iout=0.50[A], and Vsat=1.0[V], and VF=0.50[V], tr=tf=20[ns], and T=10[μs], the duty ratio D=0.14. Further, in accordance with the expressions (4) and (7), the switching element 11's power consumption Pt=150[mW], so that the diode power consumption Pd=215[mW].

Here, as a comparative example, the following description explains an arrangement in which the OFF drive circuit 32 continues to operate while the drive control signal Vdrv is inactive. In such arrangement, D31=D and D32=1−D. Thus, when circuit constant numbers of both the circuits 31 and 32 have the foregoing values and other circuit's current consumption is Iqoth=2[mA], an average value of the current consumption of the control circuit 13 is 2.65[mA]×0.14+ 3.05[mA]×0.86+2[mA]=5.00[mA]. Thus, the power consumption Pq of the control circuit 13 is 200[mW]. As a result, the power source circuit's loss P1 is 200+150+ 215=565[mW]. While, in the example of the aforementioned values, the output power Pout=2.5[W], so that the power source conversion efficiency η remains 81.6%.

On the other hand, in the present embodiment, the operational period of the OFF drive circuit 32 is limited. Thus, the circuit constant numbers of both the circuits 31 and 32 and other circuit's current consumption Iqoth are the same as in the foregoing comparative example. Supposing that a pulse width (period in which the OFF drive circuit 32 is instructed to operate) of the OFF drive control signal Voff is 400[ns], an average value of the current consumption Iq of the control circuit 13 is 2.65[mA]×0.14+3.05[mA]×0.04+2[mA]=2.493 [mA]. As a result, the power consumption Pq of the control circuit 13 is reduced to 99.72[mW], and the power source conversion efficiency η is improved to 84.3%.

Here, the pulse width of the OFF drive control signal Voff (period in which the OFF drive circuit 32 is instructed to operate) is set to be a period in which it is possible to sufficiently draw electric charge stored between the base and the emitter (electric charge stored in a gate in a case of a TFT described later) of the switching element 11. For example, when base-emitter capacitance is 5[pF], and a base-emitter voltage is 0.8[V], and a current (OFF drive current) that the OFF drive circuit 32 draws from the base of the switching element 11 is 10[mA], the foregoing time is 0.8[V]×500 [pF]/10[mA]=40[ns]. Thus, the pulse width of the OFF drive control signal Voff is set to not less than 40[ns].

While, when the pulse width of the OFF drive control signal Voff becomes longer, the power consumption Pq of the control circuit 13 becomes larger as described above, so that it is desirable that the pulse width of the OFF drive control signal Voff is as short as possible in terms of efficiency.

Thus, the pulse width of the OFF drive control signal Voff is set so as not to prevent the switching element 11 from surely OFF-driving, and so as to be capable to sufficiently reduce the power consumption Pq. For example, as long as the operational period of the OFF drive circuit 32 is several % with respect to a switching cycle, an average value of the power consumption of the OFF drive circuit 32 is sufficiently small, and also the power consumption Pq is sufficiently small. Further, when the OFF drive circuit 32 operates for a period which is approximately 1% with respect to the switching cycle, the OFF drive circuit 32 can turn OFF the switching element 11 without fail. Thus, a value of approximately 1 to 5% with respect to the switching cycle (in the case of 400[ns] of the foregoing example) is preferable as the operational period of the OFF drive circuit 32. Note that, when the switching cycle is so short that the sure OFF-driving of the switching element 11 may be prevented, the value may be set to be higher than 5%.

Further, in the present embodiment, a period in which the OFF drive circuit 32 operates is limited. Thus, unlike an arrangement in which the OFF drive circuit 32 operates while the drive control signal Vdrv is inactive, even when the resistance value of the resistor R31 shown in FIG. 2 is made smaller, an average amount of a useless current in a certain time does not become larger, so that it is possible to reduce the resistance value of the resistor R31. Thus, it is possible to increase an operational speed of the switching element 11, so that it is possible to reduce the switching loss of the switching element 11. As a result, it is possible to further improve the power source conversion efficiency η.

More specifically, the electric charge stored in the capacitor between the base and the emitter of each of the transistors Q31 and Q32 is discharged by the resistor R31. Thus, as long as the resistance value of the resistor R31 is made smaller, it is possible to shorten the OFF period of both the transistors Q31 and Q32. While, when the resistance value of the resistor R31 is made smaller, a current, which flows in the resistor R31 while both the transistors Q31 and Q32 are ON, increases, so that the power consumption of the OFF drive circuit 32 increases. Thus, in such an arrangement that the OFF drive circuit 32 operates while the drive control signal Vdrv is inactive, it is impossible to sufficiently reduce the resistance value of the resistor R31.

However, in the switching power source circuit 1 according to the present embodiment, the pulse width control circuit 33 shortens the operational period of the OFF drive circuit 32 so that it is possible to sufficiently draw the electric charge stored between the base and the emitter (stored in a gate in case of a TFT described later) of the switching element 11. Thus, it is possible to set the resistance value of the resistor R31 to be lower, thereby improving the power source conversion efficiency η of the switching power source circuit 1.

[Embodiment 2]

Figure 4:
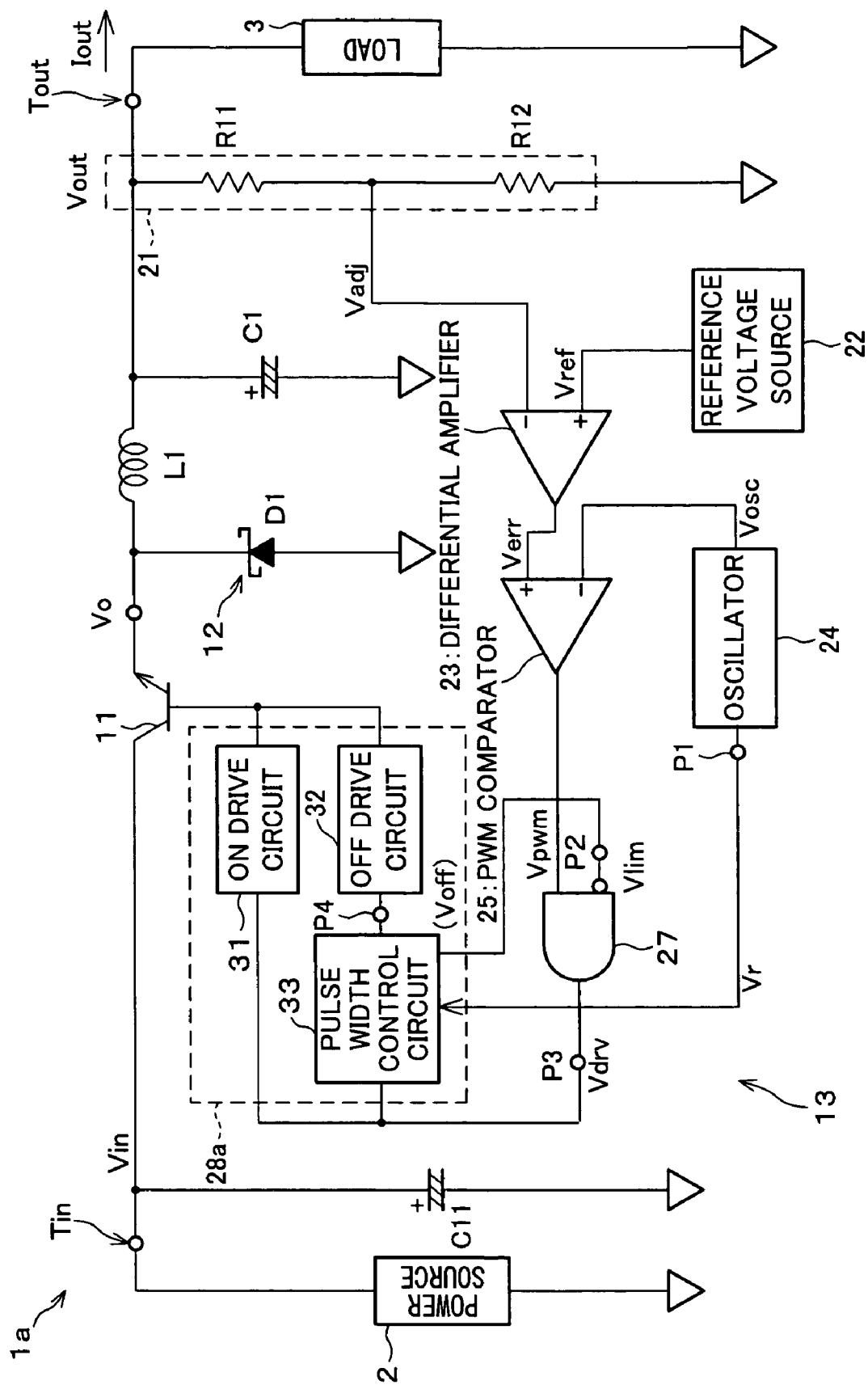
FIG. 4 shows another embodiment of the present invention, and is a block diagram showing important components of a switching power source circuit.

A switching power source circuit 1a according to the present embodiment is arranged substantially in the same manner as in the switching power source circuit 1 according to Embodiment 1 as shown in FIG. 4, but the switching power source circuit 1a is different from the switching power source circuit 1 in that the duty limit signal generating circuit 26 is deleted. Further, in the switching power source circuit 1a, a pulse width control circuit 33a provided instead of the pulse width control circuit 33 generates a duty limit signal Vlim which is active for a longer period than the OFF drive control signal Voff and is synchronized with the triangular wave Vosc.

In the foregoing arrangement, the pulse width control circuit 33a which generates the OFF drive control signal Voff functions also as the duty limit signal generating circuit 26, and generates also the duty limit signal Vlim. Thus, unlike an arrangement in which a circuit for generating the duty limit signal Vlim generates the duty limit signal Vlim separately from a circuit for generating the OFF drive control signal Voff, it is possible to make the pulse width of the OFF drive control signal Voff shorter than the pulse width (active period) of the duty limit signal Vlim.

Here, a minimum value of a period in which the switching element 11 is OFF corresponds to a length of a period in which the duty limit signal Vlim is active. Thus, it is possible to set a period in which the OFF drive circuit 32 operates to be shorter than the period in which the switching element 11 is OFF regardless of the load current Iout and the input voltage Vin, so that it is possible to reduce the power consumption of the switching power source circuit 1 without fail.

Figure 5:
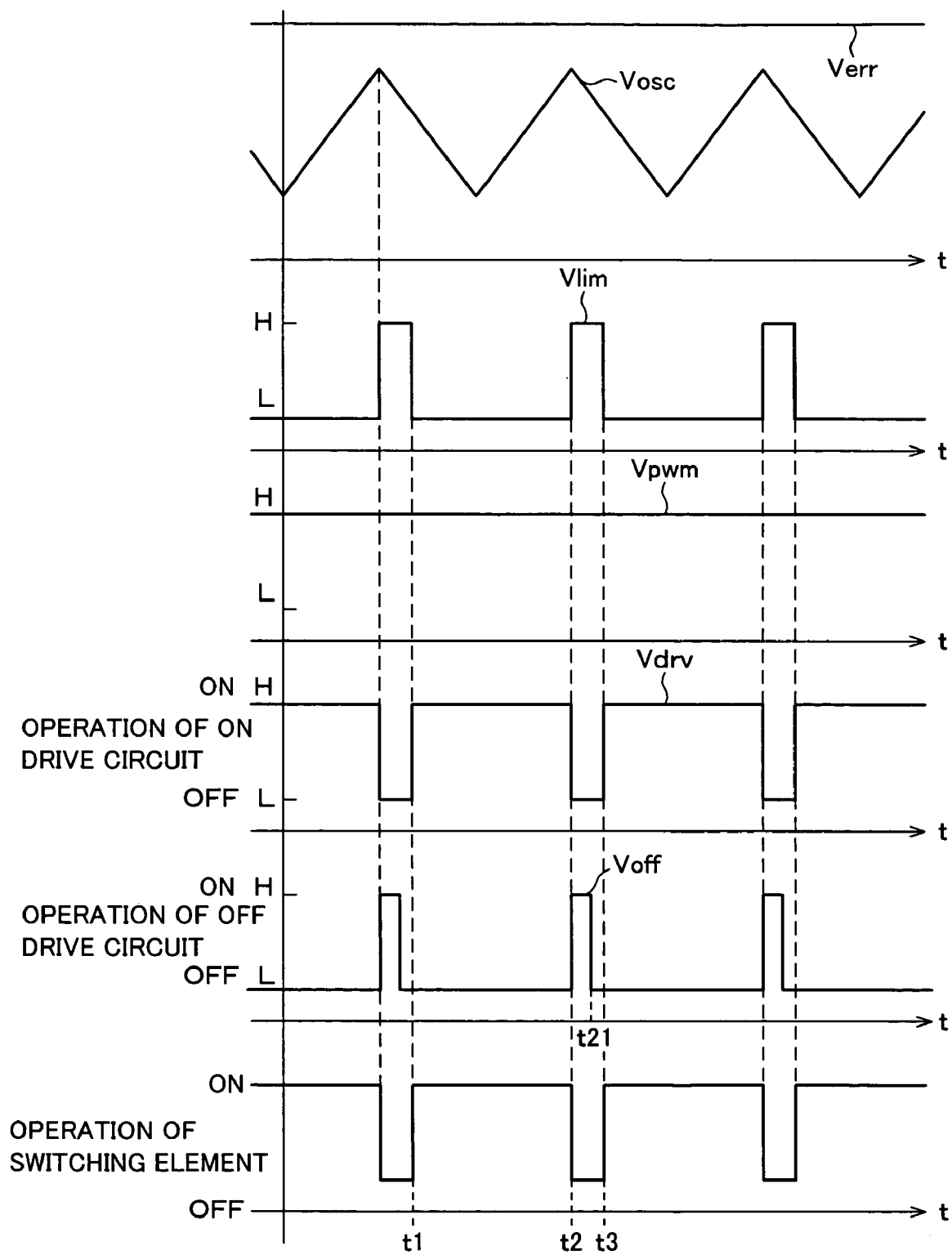
FIG. 5 is a waveform schematic showing how the switching power source circuit operates.

Here, FIG. 5 shows a condition, such as a short-circuit condition or the like, under which an OFF period of the switching element 11 is determined in accordance with the duty limit signal Vlim. Under such condition, a pulse width of the PWM signal Vpwm is longer than a period in which the duty limit signal Vlim is inactive. Note that, the example shown in FIG. 5 shows a case where the duty ratio of the PWM signal Vpwm is 100% (always active).

Thus, the duty ratio of the drive control signal Vdrv has a maximum value, i.e., (duty ratio of 1-duty limit signal Vlim), and the drive control signal Vdrv is inactive only during a period in which the duty limit signal Vlim is active.

In this manner, even when a period in which the drive control signal Vdrv is inactive is minimized, the pulse width of the OFF drive control signal Voff is set to be shorter than the pulse width of the duty limit signal Vlim.

Thus, even when the OFF period is minimized, the pulse width control circuit 33a can operate the OFF drive circuit 33 only during a period (period from t2 to t11) which is shorter than a period (period from t2 to t3) in which the switching element 11 is OFF. As a result, even when the OFF period is minimized, it is possible to reduce the power consumption of the switching power source circuit 1a.

Figure 6:
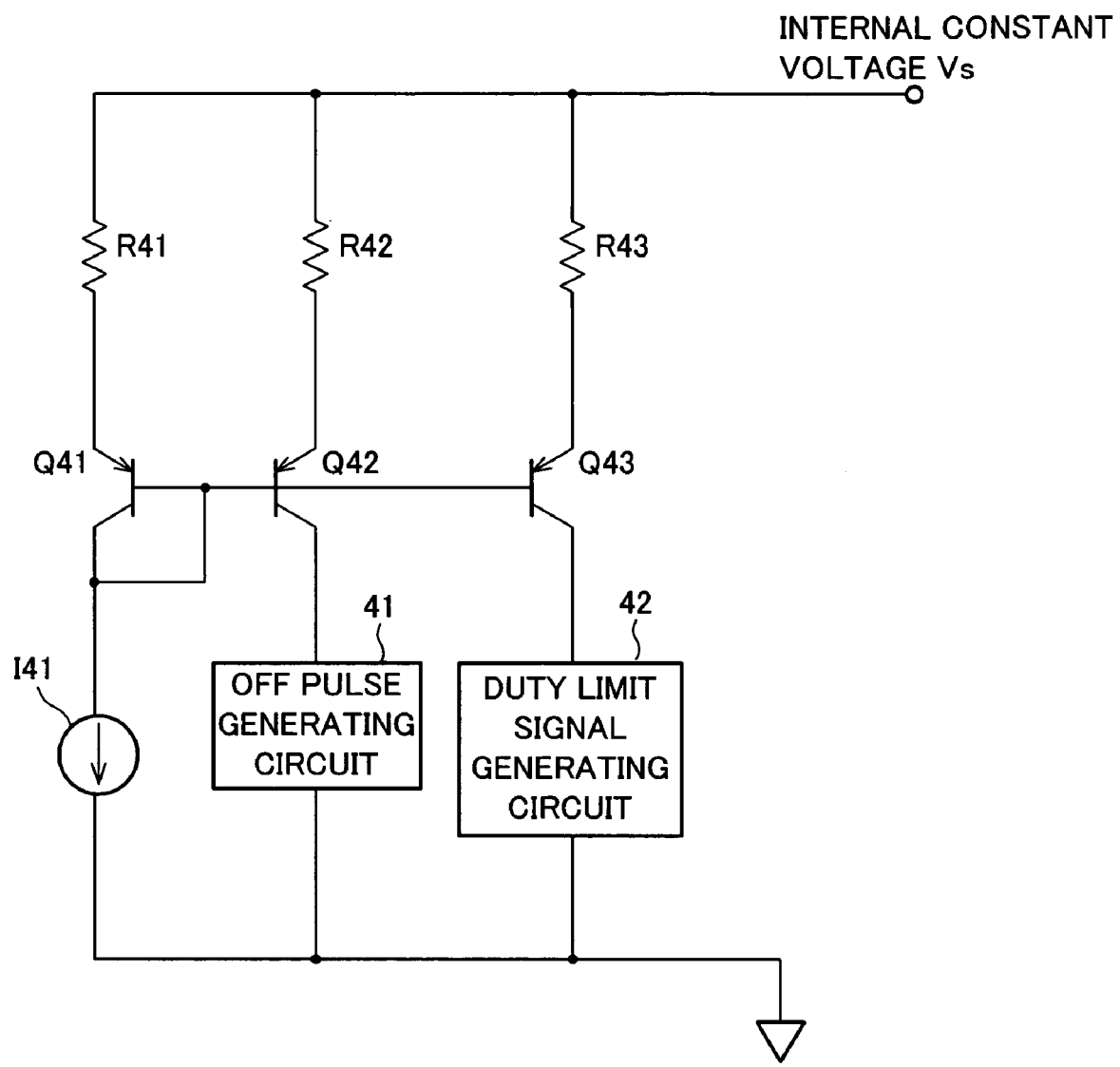
FIG. 6 is a block diagram showing an example of an arrangement of a pulse width control circuit provided in the switching power source circuit.

The following description will explain an example of an arrangement of the pulse width control circuit 33a. That is, the pulse width control circuit 33a according to the present arrangement example, as shown in FIG. 6, includes: an OFF drive control signal generating circuit (first pulse generating means) 41 for generating the OFF drive control signal Voff whose pulse width is determined by an inputted current; a duty limit signal generating circuit (second pulse generating means) 42 for generating the duty limit signal Vlim whose pulse width is determined by an inputted current; a constant current source I41 which functions as a reference constant current source; and a current mirror circuit, constituted of PNP-type bipolar transistors Q41 to Q43, which supplies a current interrelated with a constant current I41 of the constant current source I41 to both the circuits 41 and 42.

Note that, bases of the transistors Q41 to Q43 are connected to each other, and are connected to a collector of the transistor Q41. Further, collectors of the transistors Q41 to Q43 are respectively connected to the constant current source I41, the OFF drive control signal generating circuit 41, and the duty limit signal generating circuit 42. Further, an internal constant voltage source (not shown) applies a constant voltage Vs to emitters of the transistors Q41 to Q43 via resistors R41 to R43 respectively.

In the foregoing arrangement, the current mirror circuit is constituted of the transistors Q41 to Q43, and currents which are interrelated with each other respectively flow to the OFF drive control signal generating circuit 41 and the duty limit signal generating circuit 42. Thus, due to unevenness in manufacturing the switching power source circuit 1 and variation of ambient temperature, each of currents supplied to both the circuits 41 and 42 may have a value which deviates from a designed value, and each of the pulse widths of the OFF drive control signal Voff and the duty limit signal Vlim may have a value which deviates from a designed value. Even when the unevenness and variation occur, they are interrelated with each other. While, both the circuits 41 and 42 respectively determine the pulse widths of the signals Voff and Vlim generated thereby in accordance with the currents respectively supplied thereto. As a result, the OFF drive control signal generating circuit 41 can surely generate the OFF drive control signal Voff whose pulse width is shorter than the pulse width of the duty limit signal Vlim generated by the duty limit signal generating circuit 42, regardless of the manufacturing unevenness and the variation of ambient temperature.

Each of the OFF drive control signal generating circuit 41 and the duty limit signal generating circuit 42 is realized by such an arrangement that: for example, its output is kept at a first value and a constant current continues to be supplied to a capacitor during a period from a time when a signal functioning as a trigger is inputted to a time when a both-terminal voltage of a capacitor exceed a threshold value, and its output is kept at a second value during a period from a time when the voltage exceeds the threshold value to a time when a next signal functioning as a trigger is inputted. Note that, the capacitor is discharged during the period from a time when the voltage exceeds the threshold value to a time when the next signal functioning as a trigger is inputted.

Figure 7:
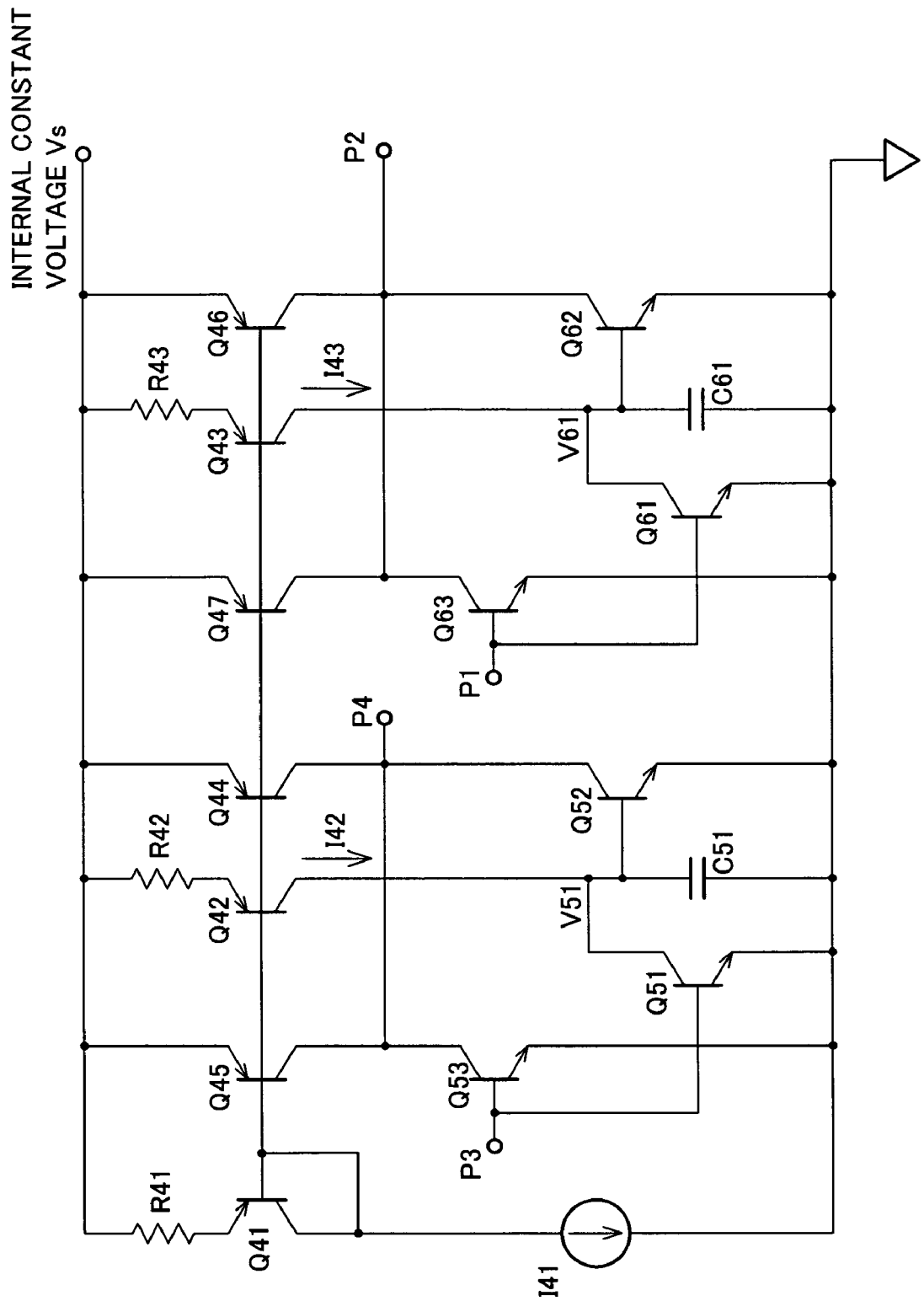
FIG. 7 is a circuit diagram showing the pulse width control circuit in more detail.

More specifically, for example, as shown in FIG. 7, the OFF drive control signal generating circuit 41 includes a capacitor C51 for receiving a constant current supplied from the transistor Q42. A transistor Q51 is connected to the capacitor C51 in parallel, and the drive control signal Vdrv is applied to a base of the transistor Q51, as the signal functioning as a trigger, via an input terminal P3. The present arrangement example shows a case where the drive control signal Vdrv is highly active, and the transistor Q51 which functions as the NPN-type bipolar transistor becomes OFF with it triggered when the drive control signal Vdrv varies from a high level to a low level. Thus, the OFF drive control signal generating circuit 41 begins charging the capacitor C51 with a constant current, with it triggered when the drive control signal Vdrv varies from a high level to a low level (variation from active to inactive).

While, a base of an NPN-type bipolar transistor (signal generating circuit) Q52 is connected to a junction of the transistor Q51 and the capacitor C51, and a collector of the transistor Q52 is connected to the OFF drive circuit 32 as an output terminal P4. Note that, the other end (an end portion opposite to the transistor Q51) of the capacitor C51 and emitters of the transistors Q51 and Q52 are grounded.

Further, a PNP-type bipolar transistor Q44 supplies a current to the output terminal P4. Note that, in the present arrangement example, the current mirror circuit constituted of the transistor Q41 and the transistor Q44 supplies a current interrelated with the constant current I41 of the constant current source I41 to the output terminal P4. However, as long as the current can be supplied to the output terminal P4, it may be so arranged that a constant current source provided separately from the constant current source I41, or a resistor provided between a power source line and the output terminal P4 supplies a current which is not interrelated with the constant current I41.

Further, the output terminal P4 is grounded via the transistor Q53 which is turned ON/OFF interlocking with the transistor Q51. The transistor Q53 according to the present arrangement example is an NPN-type bipolar transistor, and the drive control signal Vdrv is applied to a base of the transistor Q53. Further, a transistor Q45 arranged in the same manner as the transistor Q44 supplies a current to the output terminal P4.

While, also the duty limit signal generating circuit 42 includes members 61 to 63 and C61 connected in the same manner as the members Q51 to Q53 and C51 of the OFF drive control signal generating circuit 41. However, in the duty limit signal generating circuit 42, an output terminal P2 is connected to a negative logic input of a gate circuit 27, and can output a highly active duty control signal Vlim. Further, a square wave Vr which varies between a high level and a low level in synchronism with the triangular wave Vosc is applied to an input terminal P1 as the signal functioning as a trigger. In the present arrangement example, the square wave Vr varies from a high level to a low level at a time when the triangular wave Vosc becomes a maximum level, and the square wave Vr varies from a low level to a high level at a time when the triangular wave Vosc becomes a minimum level, and the transistor Q51 which functions as the NPN-type bipolar transistor becomes OFF with it triggered when the square wave Vr varies from a high level to a low level. Thus, the duty limit signal generating circuit 42 begins charging the capacitor C61 with a constant current by being triggered by the variation.

Further, in the foregoing arrangement example, resistance values of the resistors R42 and R43 of the OFF drive control signal generating circuit 41 and the duty limit signal generating circuit 42 are set to be equal to each other, and the transistors Q42 and Q43 are realized by using the same element. Further, a capacitance value of the capacitor C51 is set to be smaller than a capacitance value of the capacitor C61. Thus, a time constant of a circuit for charging the capacitor C51 is smaller than a time constant of a circuit for charging the capacitor C61. As a result, a period in which the OFF drive control signal Voff generated by the OFF drive control signal generating circuit 41 instructs the OFF drive circuit to operate is set to be shorter than a period in which the duty limit signal Vlim generated by the duty limit signal generating circuit 42 is active.

In the foregoing arrangement, as shown in FIG. 8, the transistor Q61 of the duty limit signal generating circuit 42 is ON while a level of the square wave Vr is high (period to t41), so that a potential V61 of a side end portion A2 of the transistor Q42 of the capacitor C61 is kept at a low level. Further, under such condition, the transistor Q63 is ON, so that a potential of the output terminal P2, i.e., the duty limit signal Vlim is kept at a low level.

Further, when the square wave Vr varies from a high level to a low level at t41, the transistor Q63 becomes OFF, so that the duty limit signal Vlim varies to a high level. Further, the transistor Q61 becomes OFF at t41, so that the transistor Q43 begins charging the capacitor C61. Thus, the potential V61 of the end portion A2 of the capacitor C61 gradually increases during a period from t41 to t42.

When the potential V61 increases and exceeds Vbe of the transistor (signal generating circuit) Q62 at t42, the transistor Q62 becomes ON. Thus, the duty limit signal Vlim varies to a low level.

Further, when the square wave Vr varies to a high level at t43, the transistors Q61 and Q63 become ON. Thus, the electric charge stored in the capacitor C61 is discharged, so that the potential V61 of the end portion A2 varies to a low level.

Here, a period T2 in which a level of the duty limit signal Vlim is high (in which the duty limit signal Vlim is active) corresponds to a time taken to charge the capacitor C61 (period from t41 to t42), and the period is determined in accordance with a current I43 flowing to the transistor Q43 and a capacitance value C61 of the capacitor C61.

For example, when I43=10[μA], C61=10[pF], Vbe of the transistor Q62 is 0.65[V], the time T2 is T2=650[ns] in accordance with the following expression (10).

$$T2 = Vbe \times C61 / I43 \qquad (10)$$

Note that, in the present arrangement example, a current value of the constant current source I41 is set to 10[μA], and the transistors Q41 and Q43 are equal in terms of the element used as a material for each of them, and each of resistance values of the resistors R41 and R43 is set to 1[kΩ], and I43=10[μA].

Likewise, in the OFF drive control signal generating circuit 41, as shown in FIG. 9, while the drive control signal Vdrv is active (period to t51), the transistors Q51 and Q53 become ON, so that a potential of the output terminal P4, i.e., a level of the highly active OFF drive control signal Voff becomes low.

Further, when the drive control signal Vdrv becomes inactive at t51, the transistor Q53 becomes OFF, so that a level of the OFF drive control signal Voff becomes high (active). Further, the transistor Q51 becomes OFF at t51, so that the transistor Q42 begins charging the capacitor C51. Thus, during a period from t51 to t52, a potential V51 of an end portion A1 of the capacitor C51 gradually increases.

When the potential V51 increases and exceeds Vbe of the transistor Q52 at t52, the transistor Q52 becomes ON. Thus, a potential of the output terminal P4 varies to a low level, so that the OFF drive control signal Voff becomes inactive.

Further, when the drive control signal Vdrv becomes active at t53, the transistors Q51 and Q53 become ON. Thus, the electric charge stored in the capacitor C51 is discharged, so that a potential V51 of the end portion A1 varies to a low level.

Also in the OFF drive control signal generating circuit 41, a period T1 in which a level of the OFF drive control signal Voff is high (a period in which the OFF drive control signal Voff is active) corresponds to a time taken to charge the capacitor C51 (period from t51 to t52), and the time is determined in accordance with a current I42 flowing to the transistor Q42 and a capacitance value C51 of the capacitor C51.

For example, supposing that I42=10[μA], C51=5[pF], Vbe of the transistor Q52 is 0.65[V], the period T1 is T1=325[ns] in accordance with the following expression (11)

$$T1 = Vbe \times C51/I42 \quad (11)$$

Note that, in the present arrangement example, the transistors Q41 and Q42 are equal in terms of the element used as a material for each of them, and each of resistance values of the resistors R41 and R42 is set to 1[kΩ], and I42=10[μA].

In this manner, foregoing arrangement example is such that: an amount of a current supplied to the capacitor C51 and an amount of a current supplied to the capacitor C61 are set to be equal to each other, and a capacitance value of the capacitor C51 is set to be lower than that of the capacitor C61, so that the period T1 in which the OFF drive control signal Voff generated by the OFF drive control signal generating circuit 41 instructs the OFF drive circuit to operate is set to be shorter than the period T2 in which the duty limit signal Vlim generated by the duty limit signal generating circuit 42 is active.

Incidentally, the foregoing description explained such case that: an amount of a current (I42) supplied to the circuit 41 and an amount of a current (I43) supplied to the circuit 42 are set to be equal to each other, and a capacitance value of the capacitor (C51) and a capacitance value of the capacitor (C61) are set to be different from each other, so that it is possible to set the period T1 to be shorter than the period T2. However, the arrangement is not limited to this.

Inversely, it may be so arranged that: the capacitance values of both the capacitors C51 and C61 are set to be equal to each other, and the constant current I42 is set to have a larger value than that of the constant current I43, thereby setting the period T1 to be shorter than the period T2.

For example, when the resistance values of the resistors R42 and R43 are set to be different from each other so as to vary a collector ratio of the transistors Q42 and Q43, it is possible to set the constant current I42 to have a value different from that of the constant current I43.

For example, each of the resistance values of the resistors R41 and R43 is set to 1[kΩ], and a resistance value of the resistor R42 is set to 2[kΩ], and the collector ratio of the transistors Q41, Q42, and Q43 (Q41:Q42:Q43) is set to 1:2:1. In this case, when the constant current I41=10[μA], the constant current I42 is 20[μA] and the constant current I43 is 10[μA]. Thus, even when the capacitance values of both the capacitors C51 and C61 are set to be equal to 10[pF], the period T1 in which the OFF drive control signal Voff generated by the OFF drive control signal generating circuit 41 instructs the OFF drive circuit to operate is 325[μs] and the period T2 in which the duty limit signal Vlim generated by the duty limit signal generating circuit 42 is active is 650[μs], so that the period T1 is set to be shorter than the period T2.

Incidentally, the current mirror circuit constituted of the transistors Q41 to Q43 supplies the constant current I41 of the constant current source I41 to the OFF drive control signal generating circuit 41 and the duty limit signal generating circuit 42. Thus, in a case where the constant current I41 has no temperature dependency, when Vbe of the transistors Q41 to Q43 varies due to variation of temperature, the currents I42 and I43 respectively supplied to both the circuits 41 and 42 vary.

On the other hand, the constant current source I41 according to the present arrangement example generates the constant current I41 in accordance with Vbe of the transistor, and causes the constant current I41 to vary in accordance with variation of Vbe of the transistor so as to prevent variation of the currents I42 and I43 that is caused by the variation of Vbe of the transistors Q41 to Q43.

Figure 10:
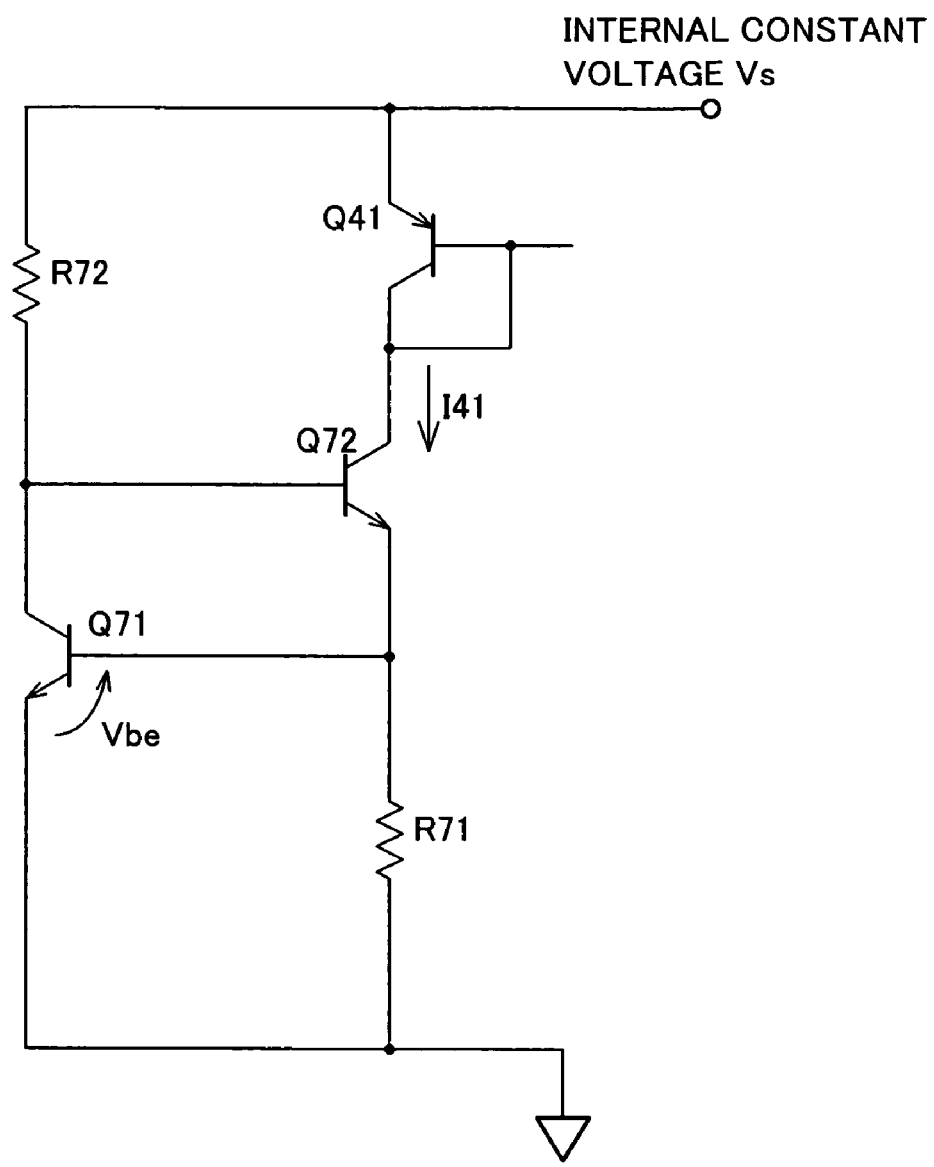
FIG. 10 is a circuit diagram showing an example of an arrangement of a constant current source provided in the pulse width control circuit.

Specifically, as shown in FIG. 10, the constant current source I41 includes: an NPN-type bipolar transistor Q71; and a resistor R71 disposed between a base and an emitter of the transistor Q71. The aforementioned internal constant voltage Vs is applied to a collector of the transistor Q71 via the resistor R72. Further, a base of an NPN-type bipolar transistor (current outputting means) Q72 is connected to a junction of the transistor Q71 and the resistor R72, and an emitter of the transistor Q72 is connected to the one end of both ends of the resistor R71 which one end is positioned on the side of a base of the transistor Q71. Further, a collector of the transistor Q72 is connected to a collector of the transistor Q41, constituting the current mirror circuit, as an output terminal.

In the arrangement, when the current I41 flowing through the resistor R71 increases and exceeds Vbe of the transistor Q71, the transistor Q71 becomes ON. Thus, a base potential of the transistor Q72 drops, so that the current I41 decreases. Inversely, when the current I41 flowing in the resistor R71 decreases and becomes lower than Vbe of the transistor Q71, the transistor Q71 is turned OFF. Thus, a base potential of the transistor Q71 increases, so that the current I41 increases. Thus, the constant current I41 is controlled so that voltages of both ends of the resistor R71 corresponds to Vbe of the transistor Q71, so that the constant current I41 is represented by the following expression (12).

$$I41 = Vbe/R71 \quad (12)$$

Here, in the foregoing arrangement example, each of both the currents I42 and I43 is interrelated with the current I41, and can be represented as follows: I42=a1×I41 and I43=a2×I41. Note that, each of a1 and a2 is a constant determined by the resistance values R41 to R43.

Thus, the aforementioned expressions (10) and (11) are respectively changed as shown in the following expressions (13) and (14).

$$T2 = Vbe \times C61/(a \times Vbe/R71) \quad (13)$$
$$= C61 \times R71/a2$$

$$T1 = Vbe \times C51/(a1 \times Vbe/R71) \quad (14)$$
$$= C51 \times R71/a1$$

The periods T1 and T2 do not depend on Vbe of the transistor. As a result, it is possible to suppress the variation of the periods T1 and T2 that is caused by the variation of temperature.

Note that, each of the foregoing embodiments described the case where the power transistor which functions as a switching element is an NPN-type bipolar transistor, but the arrangement is not limited to this.

Figure 11:
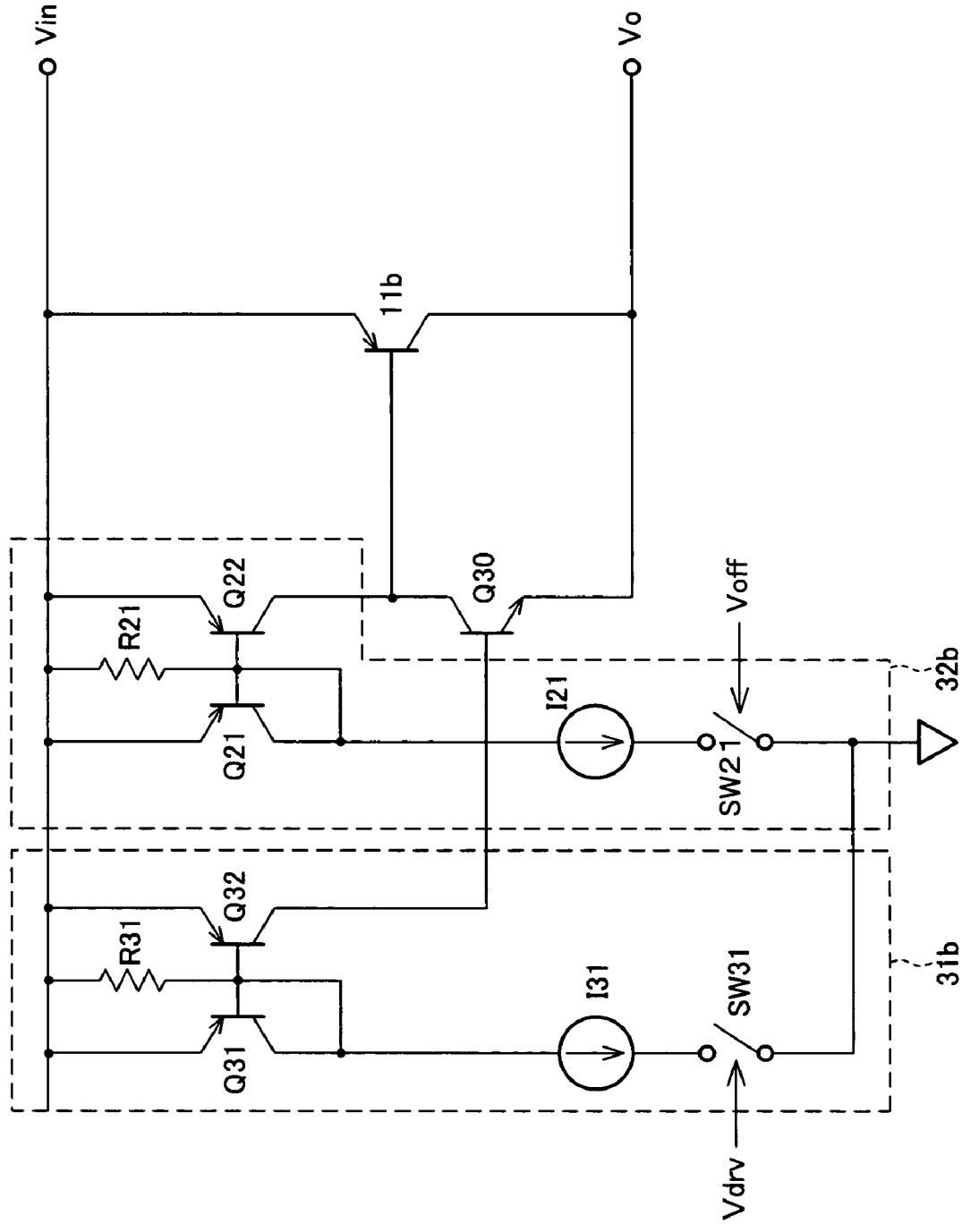
FIG. 11 is a circuit diagram showing a modification example of the switching power source circuit.

For example, as shown in FIG. 11, a PNP-type bipolar transistor may be provided as a switching element 11b. In this case, the members Q21, Q22, I21, SW21, and R21 that constitute the ON drive circuit 31 operate as an OFF drive circuit 32b in FIG. 2, and the members Q30, Q31, Q32, I31, SW31, and R31 that constitute the OFF drive circuit 32 operate as an ON drive circuit 31b in FIG. 2. Further, with this variation, the switch SW21 becomes ON when the OFF drive control signal Voff instructs the OFF drive circuit to operate, and the switch SW31 becomes ON when the drive control signal Vdrv is active.

Figure 12:
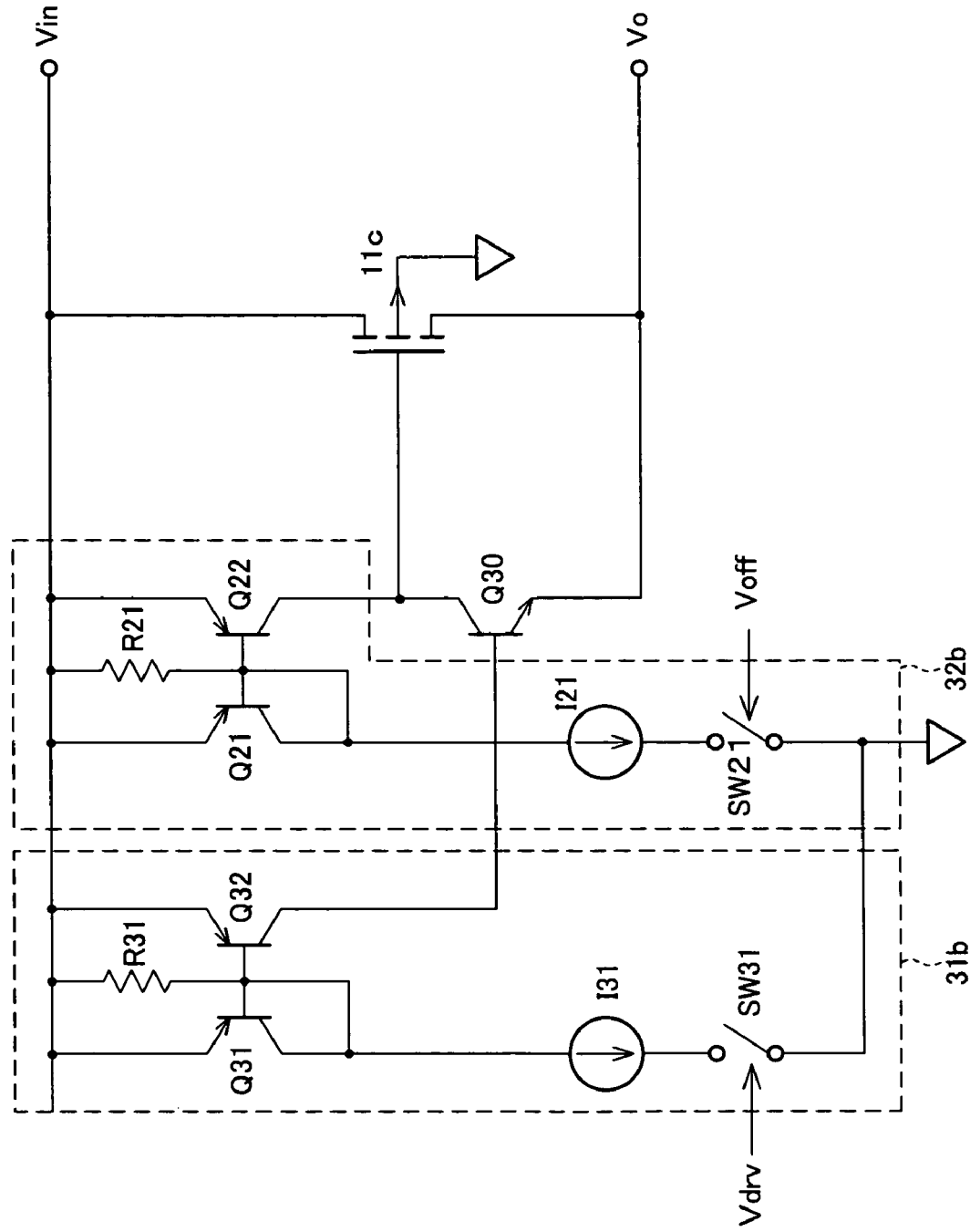
FIG. 12 is another circuit diagram showing a modification example of the switching power source circuit.
Figure 13:
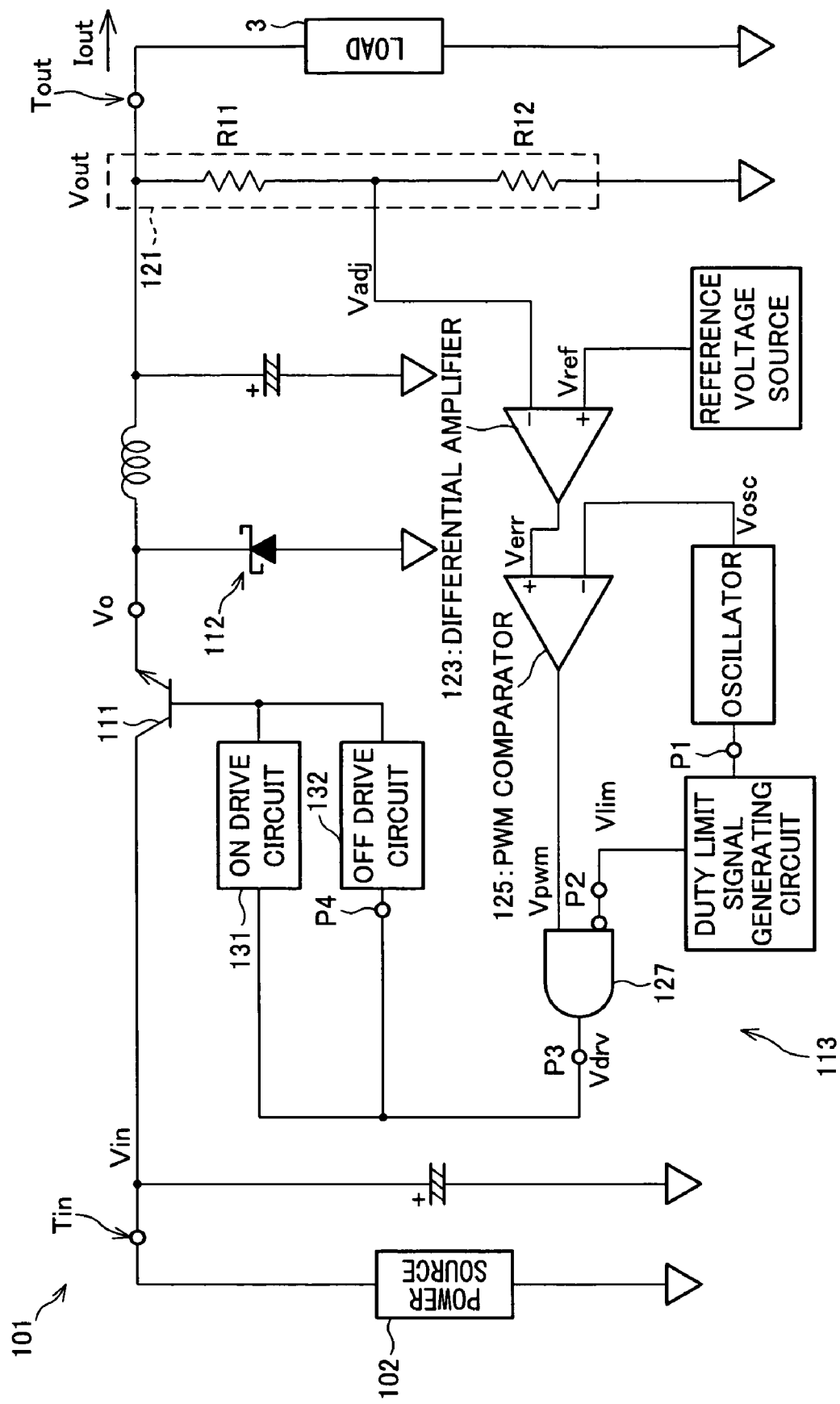
FIG. 13 shows a background art, and is a block diagram showing important components of a switching power source circuit.
Figure 14:
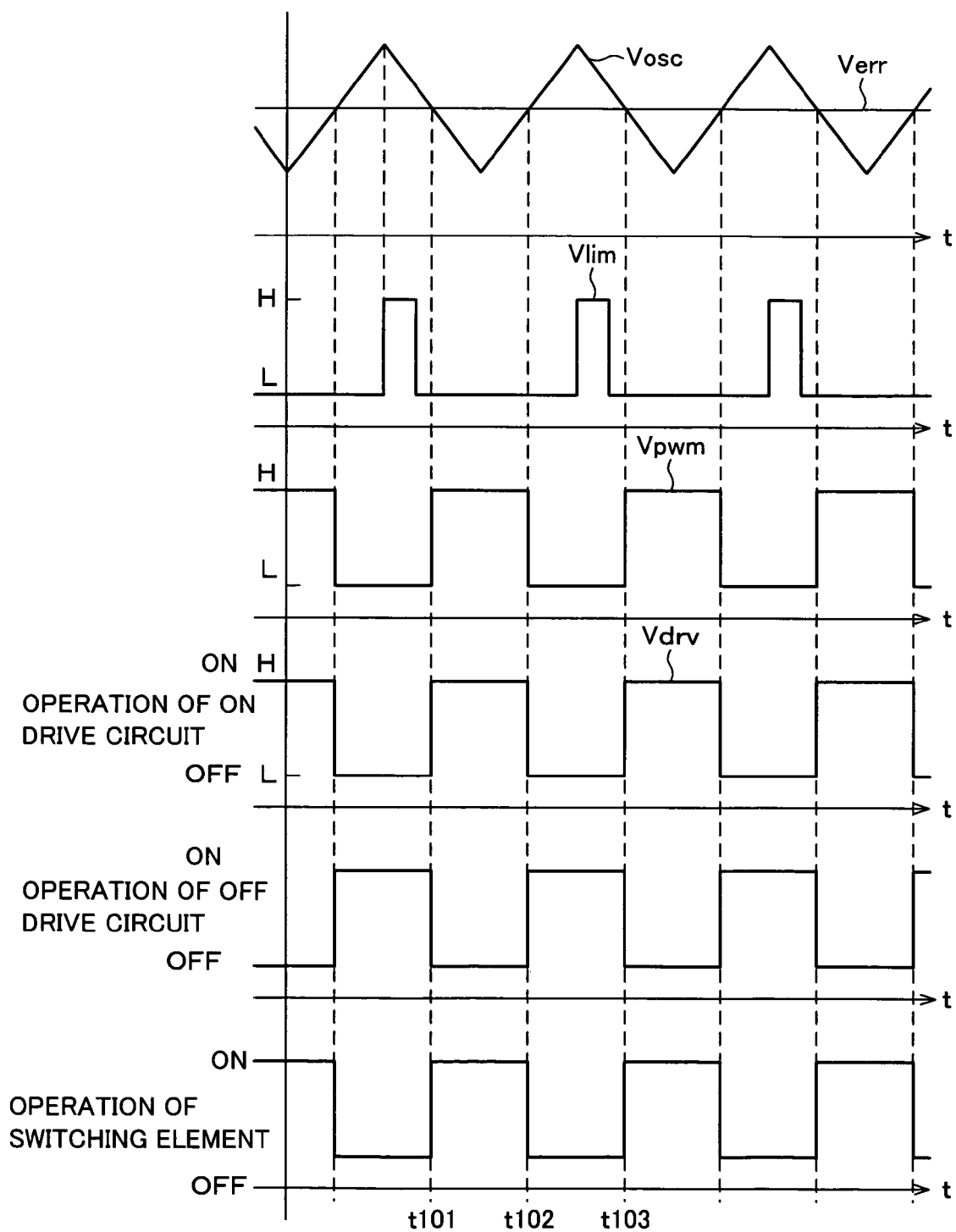
FIG. 14 is a waveform schematic showing how the switching power source circuit operates.
Figure 15:
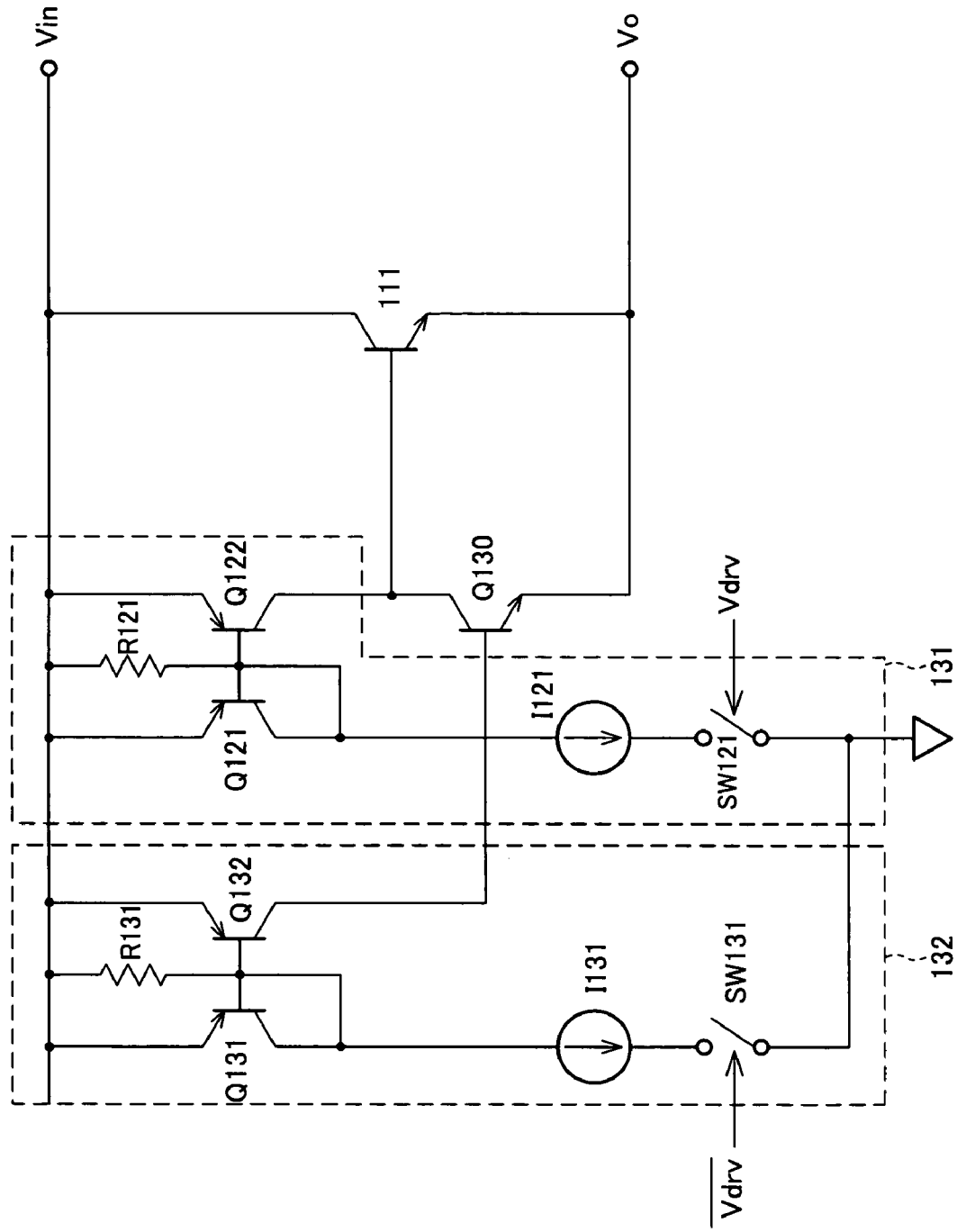
FIG. 15 is a circuit diagram showing important components of an ON drive circuit and an OFF drive circuit that are provided in the switching power source circuit.

Further, instead of the bipolar transistor, for example, a FET (Field Effect Transistor) which functions as a power transistor may be used as a switching element 11c as shown in FIG. 12. Note that, a FET having p channels or a FET having n channels may be used. FIG. 12 shows a case where the FET having p channels is used. In this case, the ON drive circuit 31b and the OFF drive circuit 32b that are arranged in the same manner as in FIG. 11 are provided, and the transistor Q22 of the OFF drive circuit 32b supplies electric charge to a gate of the switching element 11c, and increases a gate potential, thereby turning OFF the switching element 11c. Further, the transistor Q30 of the ON drive circuit 31b draws the electric charge stored in the gate of the switching element 11c, and decreases the gate potential, thereby turning ON the switching element 11c.

Even in these cases, the OFF drive circuit 32b operates only during a period shorter than a period in which the switching element 11b is OFF, so that it is possible to improve the power source conversion efficiency as in the foregoing embodiments.

Note that, the foregoing description explained the case where the switching power source circuit is used as a power source circuit which supplies power to an electronic device, or as a general power source circuit. However, as described above, the power source conversion efficiency is improved by limiting the operational period of the OFF drive circuit 32 to a part of a period in which the switching element 11 is OFF, so that the switching power source circuit can be so preferably used as a power source device of an apparatus particularly required to be smaller and to have higher efficiency.

Examples of the apparatus include an in-vehicle device such as a car audio, a liquid crystal television, or a peripheral device (CD-ROM drive and the like) of a personal computer.

As described above, the switching power source circuit (1, 1a) according to the present invention includes: an ON drive circuit (31, 31b) for generating an ON drive current which causes a switching element (11, 11a to 11c) to be turned ON; an OFF drive circuit (32, 32b) for generating an OFF drive current which causes the switching element to be turned OFF; a control circuit (differential amplifier 23, PWM comparator 25, gate circuit 27) for controlling both the ON drive circuit and OFF drive circuit so as to adjust a duty ratio of the switching element so that an output voltage has a predetermined value; and an OFF drive control circuit (pulse width control circuit 33, 33a) for causing the OFF drive circuit to begin operating at the same time as an OFF period of the switching element begins, and for causing the OFF drive circuit to stop operating before the OFF period of the switching element ends.

In the foregoing arrangement, the ON drive circuit generates the ON drive current in accordance with instruction given by the control circuit, thereby turning ON the switching element. While, the OFF drive circuit generates the OFF drive current in accordance with instruction given by the control circuit, thereby turning OFF the switching element. Here, the control circuit controls the ON and OFF drive circuits by adjusting the duty ratio so that the output voltage has a predetermined value in intermitting the switching element. Thus, the switching power source circuit can steadily supply a predetermined voltage to a load regardless of variation of the input voltage and variation of the load.

Further, the OFF drive control circuit causes the OFF drive circuit to begin operating at the same time as the OFF period of the switching element begins by shortening the pulse width of the pulse signal (OFF drive control signal) by which the control circuit instructs the OFF drive circuit to operate, and causes the OFF drive circuit to stop operating before the OFF period of the switching element ends.

In the foregoing arrangement, the OFF drive circuit operates at the same time as the OFF period of the switching element begins, so that it is possible to turn OFF the switching element without any trouble. Further, the OFF drive circuit stops operating before the OFF period of the switching element ends, so that it is possible to reduce an average value of the OFF drive current and to reduce power consumption compared with a case where the OFF drive circuit continues to operate during the OFF period. Note that, while the OFF drive circuit stops operating, the OFF drive current is not generated, but the switching element has already been shut down while the OFF drive circuit has been being operating, so that the it is possible to continue to shout down the switching element without any trouble during rest of the OFF period, that is, until the ON drive circuit begins operating again.

As a result, it is possible to realize a switching power source circuit whose power source conversion efficiency is high.

Further, in addition to the foregoing arrangement, it may be so arranged that: the OFF drive circuit includes: a constant current source (I31; I21); a current mirror circuit (transistors Q31, Q32; transistors Q21, Q22) for generating, as the OFF drive current, a current which is interrelated with a current outputted by the constant current source, so as to supply thus generated current to a control terminal of the switching element, or so as to draw thus generated current from the control terminal; and a stopping circuit (switch SW31; SW21) for causing the constant current source to stop outputting the current while the OFF drive controlling circuit indicates stoppage of operation.

In the arrangement, the current mirror circuit is used to supply the OFF drive current to the control terminal of the switching element, or to draw the OFF drive current from the control terminal, and the OFF drive circuit includes not only a current path allowing the OFF drive current to flow but also a current path allowing a current outputted by the constant current source to flow. Thus, when the OFF drive circuit continues to operate during the OFF period of the switching element, the OFF drive circuit consumes not only the OFF drive current but also the current outputted by the constant current source. However, according to the foregoing arrangement, the stopping circuit is provided, and causes the constant current source to stop supplying the current while the OFF drive control circuit instructs the OFF drive circuit to stop operating. As a result, it is possible to realize the switching power source circuit whose power source conversion efficiency is high though the current mirror circuit is provided.

Further, in addition to the foregoing arrangement, it may be so arranged that: the OFF drive circuit includes: a constant current source (I31); a current mirror circuit (transistors Q31, Q32) for outputting a current which is interrelated with a current outputted by the constant current source; a current amplifying circuit (transistor Q30) for amplifying, as the OFF drive current, the current outputted by the current mirror circuit, so as to supply thus amplified current to a control terminal of the switching element, or so as to draw thus amplified current from the control terminal; and a stopping circuit (switch SW31) for causing the constant current source to stop outputting the current while the OFF drive controlling circuit instructs the OFF drive circuit to stop operating.

As in the aforementioned arrangement having the stopping circuit, the arrangement is such that: the stopping circuit is provided, and causes the constant current source to stop supplying the current while the OFF drive control circuit instructs the OFF drive circuit to stop operating. Thus, it is possible to realize the switching power source circuit whose power source conversion efficiency is high though the current mirror circuit is provided. Further, in the foregoing arrangement, the current amplifying circuit is provided, so that it is possible to increase an amount of the current which is supplied to the control terminal of the switching element or drawn from the control terminal. As a result, it is possible to reduce a storage time and a drop time of the switching element compared with a case where the current amplifying circuit is not provided, thereby further improving the power source conversion efficiency.

Further, in addition to the foregoing arrangement, it may be so arranged that: the OFF drive controlling circuit outputs a duty limit signal (Vlim) for determining an upper limit of the duty ratio of the switching element, and the duty limit signal is set so that the OFF period of the switching element is longer than an operational period of the OFF drive circuit in a case where the duty ratio has an upper limit value.

In the foregoing arrangement, by setting the pulse width or in a similar manner for example, the duty limit signal is set so that the OFF period of the switching element in the case where the duty ratio has the upper limit value is longer than the operational period of the OFF drive circuit. Thus, the operational period of the OFF drive circuit is ordinarily shorter than the OFF period of the switching element regardless of conditions of the input voltage and the load.

Further, the OFF drive circuit controls the operational period of the OFF drive circuit, and generates the duty limit signal. Thus, unlike an arrangement in which a circuit provided separately from the OFF drive circuit generates the duty limit signal, for example, even when the operational period of the OFF drive circuit has a value, which deviates from a designed value, due to manufacturing unevenness and variation of ambient temperature, also the OFF period of the switching element in the case where the duty ratio has the upper limit value has a value which deviates from a designed value in the similar manner.

As a result, the operational period of the OFF drive circuit can be made shorter than the OFF period of the switching element, so that it is possible to set the operational period of the OFF drive circuit so as not to overlap with the ON period of the switching element. Thus, even when the duty ratio has the upper limit value, it is possible to realize the switching power source circuit which can surely turn OFF the switching element and has high power source conversion efficiency.

Further, in addition to the foregoing arrangement, it may be so arranged that: the OFF drive controlling circuit includes: a reference constant current source (I41) for generating a reference constant current; a constant current generating current mirror circuit (transistors Q41 to Q43) for generating a first constant current and a second constant current each of which is interrelated with the reference constant current outputted by the reference constant current source; a first pulse generating circuit (OFF drive control signal generating circuit 41) for determining a pulse width of the OFF drive control signal (Vdrv) indicative of the operational period of the OFF drive circuit in accordance with the first constant current; and a second pulse generating circuit (duty limit signal generating circuit 42) for determining a pulse width of the duty limit signal in accordance with the second constant current.

In the foregoing arrangement, the first pulse generating circuit for determining the pulse width of the OFF drive control signal and the second pulse generating circuit for determining the pulse width of the duty limit signal respectively determine the pulse widths in accordance with constant currents (first or second constant current) each of which is interrelated with the constant current generated by the reference constant current source. Thus, for example, even when the operational period of the OFF drive circuit has a value, which deviates from a designed value, due to manufacturing unevenness and variation of ambient temperature, also the OFF period of the switching element in the case where the duty ratio has the upper limit value has a value which deviates from a designed value in the similar manner. As a result, even when the duty ratio has the upper limit value, it is possible to realize the switching power source circuit which can surely turn OFF the switching element and has high power source conversion efficiency.

Further, in addition to the foregoing arrangement, it may be so arranged that: the first pulse generating circuit determines the pulse width of the OFF drive signal in accordance with an amount of the first constant current and capacitance of a first capacitor (C51) provided in the first pulse generating circuit, and the second pulse generating circuit determines the pulse width of the duty limit signal in accordance with an amount of the second constant current and capacitance of a second capacitor (C61) provided in the second pulse generating circuit.

In addition to the foregoing arrangement, it may be so arranged that: the first pulse generating circuit includes: a first capacitor (C51); and a first signal generating circuit (transistor Q52) for controlling the OFF drive control signal so that a period from a time when the pulse generating circuit begins charging the first capacitor (C51) with the first constant current to a time when a both-end voltage of the first capacitor has a predetermined threshold value corresponds to an active period or an inactive period, and the second pulse generating circuit includes: a second capacitor (C61); and a second signal generating circuit (transistor Q62) for controlling the duty limit signal so that a period from a time when the pulse generating circuit begins charging the second capacitor (C61) with the second constant current to a time when a both-end voltage of the second capacitor (C61) has a predetermined threshold value corresponds to an active period or an inactive period.

Here, in addition to the foregoing arrangement, it may be so arranged that: an amount of the first constant current and an amount of the second constant current are equal to each other, and the first and second capacitors that are provided in both the first and second pulse generating circuits are set to have capacitance values different from each other, or it may be so arranged that: an amount of the first constant current and an amount of the second constant current are different from each other, and the first and second capacitors that are provided in both the first and second pulse generating circuits are set to have capacitance values equal to each other.

In the foregoing arrangement, the first and second pulse generating circuits are arranged so that their pulse widths are respectively determined in accordance with amounts of the constant currents corresponding thereto and capacitance of their capacitors. Thus, the first and second pulse generating circuits are made different from each other in terms of at least either (i) the amount of the constant current or (ii) the capacitance, so that it is possible to set the respective pulse widths. Further, even when the manufacturing unevenness and the variation of ambient temperature occur, the amount of the constant current and the capacitance vary with them interrelated with each other. As a result, it is possible to realize the switching power source circuit which can surely turn OFF the switching element and has high power source conversion efficiency even when the duty ratio has the upper limit value.

Further, it may be so arranged that: the reference constant current source includes: a resistor (R71); a current control circuit (transistor Q71) for controlling an amount of a current flowing to the resistor so that a both-end voltage of the resistor corresponds to a threshold value of a base-emitter voltage of a transistor; and a current outputting circuit (transistor Q72) for outputting a current whose amount corresponds to the amount of the current flowing to the resistor as the reference constant current.

Here, when temperature varies, the threshold value (Vbe) of the base-emitter voltage of the transistor varies, so that also Vbe of a transistor which constitutes the constant current generating current mirror circuit varies. As a result, even when an amount of the constant current outputted by the reference constant current source is constant, also amounts of the first and second constant currents outputted by the current mirror circuit vary.

However, in the foregoing arrangement, also the reference constant current source is a constant current source dependent on Vbe, so that an amount of the constant current outputted by the reference constant current source varies in accordance with Vbe of a transistor. Thus, it is possible to cause the variation of the output current of the reference constant current source to prevent the variation of the amounts of the first and second constant currents that is caused by the variation Vbe of the current mirror circuit. As a result, it is possible to suppress the variation of the pulse widths of the signals that occurs with the variation of temperature.

Further, the electronic device according to the present invention includes any one of the switching power source circuits arranged in the foregoing manner. Thus, it is possible to realize the electronic device which consumes less power.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A switching power source circuit, comprising:
an ON drive circuit for generating an ON drive current which causes a switching element to be turned ON;
an OFF drive circuit for generating an OFF drive current which causes the switching element to be turned OFF;
control means for controlling both the ON drive circuit and OFF drive circuit so as to adjust a duty ratio of the switching element so that an output voltage has a predetermined value; and
OFF drive control means for causing the OFF drive circuit to begin operating at the same time as an OFF period of the switching element begins, and for causing the OFF drive circuit to stop operating before the OFF period of the switching element ends.

2. The switching power source circuit as set forth in claim 1, wherein
the OFF drive circuit includes: a constant current source; a current mirror circuit for generating, as the OFF drive current, a current which is interrelated with a current outputted by the constant current source, so as to supply thus generated current to a control terminal of the switching element, or so as to draw thus generated current from the control terminal; and stopping means for causing the constant current source to stop outputting the current while the OFF drive control means instructs the OFF drive circuit to stop operating.

3. The switching power source circuit as set forth in claim 1, wherein
the OFF drive circuit includes: a constant current source; a current mirror circuit for outputting a current which is interrelated with a current outputted by the constant current source; current amplifying means for amplifying, as the OFF drive current, the current outputted by the current mirror circuit, so as to supply thus amplified current to a control terminal of the switching element, or so as to draw thus amplified current from the control terminal; and stopping means for causing the constant current source to stop outputting the current while the OFF drive controlling means instructs the OFF drive circuit to stop operating.

4. The switching power source circuit as set forth in claim 1, wherein:
the OFF drive controlling means outputs a duty limit signal for determining an upper limit of the duty ratio of the switching element to the control circuit, and the duty limit signal is set so that the OFF period of the switching element is longer than an operational period of the OFF drive circuit in a case where the duty ratio has an upper limit value.

5. The switching power source circuit as set forth in claim 4, wherein
the OFF drive controlling means includes:
a reference constant current source for generating a reference constant current;
a constant current generating current mirror circuit for generating a first constant current and a second constant current each of which is interrelated with the reference constant current outputted by the reference constant current source;

first pulse generating means for determining a pulse width of the OFF drive control signal indicative of the operational period of the OFF drive circuit in accordance with the first constant current; and second pulse generating means for determining a pulse width of the duty limit signal in accordance with the second constant current.

6. The switching power source circuit as set forth in claim 5, wherein the first pulse generating means determines the pulse width of the OFF drive control signal in accordance with an amount of the first constant current and capacitance of a first capacitor provided in the first pulse generating means, and the second pulse generating means determines the pulse width of the duty limit signal in accordance with an amount of the second constant current and capacitance of a second capacitor provided in the second pulse generating means.

7. The switching power source circuit as set forth in claim 6, wherein:

an amount of the first constant current and an amount of the second constant current are equal to each other, and the first and second capacitors that are provided in both the first and second pulse generating means are set to have capacitance values different from each other.

8. The switching power source circuit as set forth in claim 6, wherein:

an amount of the first constant current and an amount of the second constant current are different from each other, and the first and second capacitors that are provided in both the first and second pulse generating means are set to have capacitance values equal to each other.

9. The switching power source circuit as set forth in claim 6, wherein the reference constant current source includes: a resistor; current control means for controlling an amount of a current flowing to the resistor so that a both-end voltage of the resistor corresponds to a threshold value of a base-emitter voltage of a transistor; and current outputting means for outputting a current whose amount corresponds to the amount of the current flowing to the resistor as the reference constant current.

10. The switching power source circuit as set forth in claim 5, wherein the first pulse generating means includes: a first capacitor; and a first signal generating circuit for controlling the OFF drive control signal so that a period from a time when the first pulse generating means begins charging the first capacitor with the first constant current to a time when a both-end voltage of the first capacitor has a predetermined threshold value corresponds to an active period or an inactive period, and the second pulse generating means includes: a second capacitor; and a second signal generating circuit for controlling the duty limit signal so that a period from a time when the second pulse generating means begins charging the second capacitor with the second constant current to a time when a both-end voltage of the second capacitor has a predetermined threshold value corresponds to an active period or an inactive period.

11. The switching power source circuit as set forth in claim 10, wherein:

an amount of the first constant current and an amount of the second constant current are equal to each other, and the first and second capacitors that are provided in both the first and second pulse generating means are set to have capacitance values different from each other.

12. The switching power source circuit as set forth in claim 10, wherein:

an amount of the first constant current and an amount of the second constant current are different from each other, and the first and second capacitors that are provided in both the first and second pulse generating means are set to have capacitance values equal to each other.

13. The switching power source circuit as set forth in claim 10, wherein the reference constant current source includes: a resistor; current control means for controlling an amount of a current flowing to the resistor so that a both-end voltage of the resistor corresponds to a threshold value of a base/emitter voltage of a transistor; and current outputting means for outputting a current whose amount corresponds to the amount of the current flowing to the resistor as the reference constant current.

14. An electronic device, comprising a switching power source circuit, wherein the switching power source circuit includes:

an ON drive circuit for generating an ON drive current which causes a switching element to be turned ON;

an OFF drive circuit for generating an OFF drive current which causes the switching element to be turned OFF;

control means for controlling both the ON drive circuit and OFF drive circuit so as to adjust a duty ratio of the switching element so that an output voltage has a predetermined value; and OFF drive control means for causing the OFF drive circuit to begin operating at the same time as an OFF period of the switching element begins, and for causing the OFF drive circuit to stop operating before the OFF period of the switching element ends.

* * * * *